United States Patent
Caldwell et al.

(10) Patent No.: US 11,078,934 B2
(45) Date of Patent: Aug. 3, 2021

(54) MEASUREMENT AND USE OF HYDRAULIC STIFFNESS PROPERTIES OF HYDRAULIC APPARATUS

(71) Applicant: Artemis Intelligent Power Limited, Midlothian (GB)

(72) Inventors: Niall James Caldwell, Midlothian (GB); Uwe Bernhard Pascal Stein, Midlothian (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 45 days.

(21) Appl. No.: 15/754,786

(22) PCT Filed: Aug. 24, 2016

(86) PCT No.: PCT/GB2016/052635
§ 371 (c)(1),
(2) Date: Feb. 23, 2018

(87) PCT Pub. No.: WO2017/033015
PCT Pub. Date: Mar. 2, 2017

(65) Prior Publication Data
US 2018/0245609 A1 Aug. 30, 2018

(30) Foreign Application Priority Data
Aug. 25, 2015 (EP) .................................... 15182437

(51) Int. Cl.
*F15B 19/00* (2006.01)
*F03D 17/00* (2016.01)
(Continued)

(52) U.S. Cl.
CPC ............ *F15B 19/005* (2013.01); *F03D 17/00* (2016.05); *F04B 49/06* (2013.01); *F04B 49/08* (2013.01);
(Continued)

(58) Field of Classification Search
CPC ....... G01L 23/00; G01L 27/00; G01L 27/007; F15B 19/00; F15B 19/005; F04B 51/00
(Continued)

(56) References Cited

U.S. PATENT DOCUMENTS 4,797,834 A 1/1989 Honganen et al.
4,846,792 A 7/1989 Bobo et al.
(Continued)

FOREIGN PATENT DOCUMENTS

DE 38 28 933 3/1990
DE 196 25 947 9/1997
(Continued)

OTHER PUBLICATIONS

International Search Report and Written Opinion for corresponding International PCT Application No. PCT/GB2016/052635, dated Dec. 9, 2016, pp. 1-21.
(Continued)

*Primary Examiner* — Benjamin R Schmitt
(74) *Attorney, Agent, or Firm* — Hauptman Ham, LLP

(57) ABSTRACT

A method of operating a hydraulic apparatus comprising a hydraulic circuit region and hydraulic machine which is controlled to displace pulses of fluid of known volume into or out of the hydraulic circuit region, generating pulses of pressure in the hydraulic circuit region and torque in the hydraulic machine shaft. The response of parts of the hydraulic apparatus to these pulses is measured and used to determine properties of the hydraulic apparatus. The response of the pressure in the hydraulic circuit region to pulses at different pressures can be used to measure the hydraulic stiffness of parts of the hydraulic circuit region. It is possible to detect faults and to make measurements useful in subsequent operation of the hydraulic apparatus.

18 Claims, 12 Drawing Sheets

(51) Int. Cl.
*F04B 49/08* (2006.01)
*F04B 51/00* (2006.01)
*F04B 49/06* (2006.01)
*F15B 21/08* (2006.01)

(52) U.S. Cl.
CPC .............. *F04B 51/00* (2013.01); *F15B 21/08* (2013.01); *F05B 2260/406* (2013.01)

(58) Field of Classification Search
USPC ................................................ 73/1.68, 865.9
See application file for complete search history.

(56) References Cited

U.S. PATENT DOCUMENTS

| | | | |
|---|---|---|---|
| 4,850,805 A | | 7/1989 | Madsen et al. |
| 5,457,626 A | | 10/1995 | Wolze |
| 5,957,549 A | * | 9/1999 | Nagai .................... B60T 8/4036 303/122.03 |
| 6,698,453 B1 | | 3/2004 | Hutchison et al. |
| 7,897,196 B2 | | 3/2011 | Cedrone et al. |
| 7,905,710 B2 | | 3/2011 | Wang et al. |
| 8,631,651 B2 | | 1/2014 | Elliott et al. |
| 2007/0125796 A1 | | 6/2007 | Cedrone et al. |
| 2008/0240932 A1 | * | 10/2008 | Carstensen ............. F04B 51/00 417/63 |
| 2009/0255245 A1 | * | 10/2009 | Wu ........................ F15B 11/162 60/327 |
| 2009/0317266 A1 | * | 12/2009 | Rampen ................ F03C 1/0447 417/53 |
| 2011/0142596 A1 | * | 6/2011 | Nies ...................... F15B 19/005 415/13 |
| 2012/0063919 A1 | | 3/2012 | Rampen et al. |
| 2014/0053663 A1 | | 2/2014 | Roine et al. |
| 2014/0060030 A1 | | 3/2014 | Ma et al. |
| 2015/0159646 A1 | | 6/2015 | Stiehl et al. |
| 2017/0284388 A1 | | 10/2017 | Caldwell et al. |

FOREIGN PATENT DOCUMENTS

| | | |
|---|---|---|
| DE | 10 2006 024269 | 10/2007 |
| DE | 10 2012 025197 | 7/2014 |
| EP | 2851585 A1 | 3/2015 |
| EP | 2 881 584 | 6/2015 |
| JP | S57190449 U | 12/1982 |
| JP | S60122351 A | 6/1985 |
| JP | S6313905 A | 1/1988 |
| JP | H03260404 A | 11/1991 |
| JP | H11 315771 | 11/1999 |
| JP | 2014010015 A | 1/2014 |
| JP | 2015059658 A | 3/2015 |
| WO | 02086437 A1 | 10/2002 |
| WO | 2008/118775 | 10/2008 |
| WO | 2011133560 A1 | 10/2011 |
| WO | 2012/140319 | 10/2012 |
| WO | 2012140319 A1 | 10/2012 |

OTHER PUBLICATIONS

Rampen, W.H.S., "The Digital Displacement Hydraulic Piston Pump," A Thesis Submitted for the Degree of Doctor of Philosophy, The University of Edinburgh, Dec. 1992, pp. 1-225.

* cited by examiner

| Pulse number | Advance pressure A | Following pressure B | dP | Central pressure Pmid |
|---|---|---|---|---|
| 1 | 1.1 | 1.9 | 3 | 1.5 |
| 2 | 4.35 | 5.15 | 3.5 | 4.75 |
| 3 | 8.1 | 8.9 | 4 | 8.5 |
| 4 | 12.25 | 13.05 | 4.3 | 12.65 |
| 5 | 16.5 | 17.3 | 4.2 | 16.9 |

| Pulse number | dp | P(B) ['following pressure'] | P(mid) | dV(pump) | dP(leak) | Gross dP | Gross dP/dV |
|---|---|---|---|---|---|---|---|
| 1 | 3 | 3 | 1.5 | 7.9850 | 0.0150 | 3.0150 | 0.3776 |
| 2 | 3.5 | 6.5 | 4.75 | 7.9525 | 0.0475 | 3.5475 | 0.4461 |
| 3 | 4 | 10.5 | 8.5 | 7.9150 | 0.0850 | 4.0850 | 0.5161 |
| 4 | 4.3 | 14.8 | 12.65 | 7.8735 | 0.1265 | 4.4265 | 0.5622 |
| 5 | 4.2 | 19 | 16.9 | 7.8310 | 0.1690 | 4.3690 | 0.5579 |
| 6 | 4.1 | 23.1 | 21.05 | 7.7895 | 0.2105 | 4.3105 | 0.5534 |
| 7 | 4.05 | 27.15 | 25.125 | 7.7488 | 0.2513 | 4.3013 | 0.5551 |
| 8 | 4.02 | 31.17 | 29.16 | 7.7084 | 0.2916 | 4.3116 | 0.5593 |
| 9 | 4 | 35.17 | 33.17 | 7.6683 | 0.3317 | 4.3317 | 0.5649 |
| 10 | 4 | 39.17 | 37.17 | 7.6283 | 0.3717 | 4.3717 | 0.5731 |
| 11 | 3.99 | 43.16 | 41.165 | 7.5884 | 0.4117 | 4.4017 | 0.5801 |
| 12 | 3.98 | 47.14 | 45.15 | 7.5485 | 0.4515 | 4.4315 | 0.5871 |
| 13 | 3.98 | 51.12 | 49.13 | 7.5087 | 0.4913 | 4.4713 | 0.5955 |
| 14 | 3.98 | 55.1 | 53.11 | 7.4689 | 0.5311 | 4.5111 | 0.6040 |
| 15 | 3.98 | 59.08 | 57.09 | 7.4291 | 0.5709 | 4.5509 | 0.6126 |
| 16 | 3.98 | 63.06 | 61.07 | 7.3893 | 0.6107 | 4.5907 | 0.6213 |
| 17 | 3.98 | 67.04 | 65.05 | 7.3495 | 0.6505 | 4.6305 | 0.6300 |
| 18 | 3.98 | 71.02 | 69.03 | 7.3097 | 0.6903 | 4.6703 | 0.6389 |
| 19 | 3.98 | 75 | 73.01 | 7.2699 | 0.7301 | 4.7101 | 0.6479 |
| 20 | 1 | 76 | 75.5 | 7.2450 | 0.7550 | 1.7550 | 0.2422 |
| 21 | 1.1 | 77.1 | 76.55 | 7.2345 | 0.7655 | 1.8655 | 0.2579 |
| 22 | 1.1 | 78.2 | 77.65 | 7.2235 | 0.7765 | 1.8765 | 0.2598 |

Fig. 13

MEASUREMENT AND USE OF HYDRAULIC STIFFNESS PROPERTIES OF HYDRAULIC APPARATUS

FIELD OF THE INVENTION

The invention relates to the field of hydraulic transmissions and other hydraulic apparatuses including variable displacement hydraulic pumps or motors including but not limited to those having electronically controlled valves which are controlled to determine whether each working chamber carries out an active cycle or an inactive cycle on each cycle of working chamber volume.

BACKGROUND TO THE INVENTION

It is known to use a hydraulic transmission, with a variable displacement hydraulic pump and a variable displacement hydraulic motor, in apparatus such as wind turbine generators and vehicles. For example, in the case of a wind turbine generator, a variable displacement hydraulic pump may be driven by a drive shaft connected to a rotor which is driven by the wind, and one or more variable displacement hydraulic motors may be connected to one or more electrical generators, and driven by pressurised hydraulic fluid from the output of the hydraulic pump. In the case of a vehicle, a prime mover (e.g. an internal combustion engine or electric motor), possibly with intermediate torque-conversion device, may drive the hydraulic pump, and a subsequent hydraulic motor (driven by hydraulic fluid pressurised by the pump) may provide motive power to the drive wheels, or may drive another actuator.

A hydraulic system typically comprise fluid load(s) (hydraulic consumers, e.g. hydraulic motors) and fluid source(s) (e.g. hydraulic pumps), with fluid conduits in the form of pipes, galleries and hoses. They may also include accumulators which can serve several purposes, for example, smoothing, reducing pressure peaks and/or dynamic pressure ripple, or as short term stores of fluid energy. A favoured type of hydraulic accumulator is the compressed gas (or gas-charged) closed accumulator, which typically contains a chamber with an inert gas under pressure (typically nitrogen) that provides the compressive force on the hydraulic fluid. It is important to detect accumulator failure, which is frequently due to perforation or failure of the bladder in some way, leading to loss of precharge. Another favoured accumulator is the foam-filled accumulator, which may substitute the pressurised nitrogen-holding bladder, for a region of foam, or may replace the nitrogen in the bladder with a foam/foam-like filling. A faulty accumulator may result in unexpected system operational characteristics and some embodiments of the invention seek to check the function, or identify faults in accumulators.

More generally, there is a need to monitor the status of hydraulic systems and regions of hydraulic systems, to check for correct function or to determine faults. It is also necessary to take into the account the properties of hydraulic systems in order to control them accurately. However, this is made difficult by the tendency of such systems to vary from one machine to the next, or to change over time perhaps due to the addition, removal, replacement of, or age/use related variation in a hydraulic system mechanical component. Accordingly, some embodiments of the invention address problems of checking, diagnosing faults in, monitoring or controlling hydraulic systems.

The invention makes use of hydraulic pumps or motors which are controllable to displace pulses of hydraulic fluid of known volume into or out of a hydraulic circuit region. The volume of a pulse may be known because it is controlled and/or because it is measured. Suitable variable displacement hydraulic pumps and motors for carrying out the invention include those which comprise a rotating shaft and a plurality of cylinders of cyclically varying working volume, in which the displacement of hydraulic fluid through each cylinder is regulated by electronically controllable valves, on each cycle of cylinder working volume, and in phased relationship to cycles of cylinder working volume, to determine the net throughput of hydraulic fluid by the machine. For example, EP 0361927 disclosed a method of controlling the net throughput of hydraulic fluid through a multi-cylinder pump by opening and/or closing electronically controllable valves, in phased relationship to cycles of cylinder working volume, to regulate fluid communication between individual cylinders of the pump and a low pressure hydraulic fluid line. As a result, individual cylinders are selectable by a valve control module, on each cycle of cylinder working volume, to either displace a predetermined fixed volume of hydraulic fluid (an active cycle), or to undergo an inactive cycle (also referred to as an idle cycle) in which there is no net displacement of hydraulic fluid, thereby enabling the net throughput of the pump to be matched dynamically to demand. EP 0494236 developed this principle and included electronically controllable poppet valves, which regulate fluid communication between individual cylinders and a high pressure hydraulic fluid line, thereby facilitating the provision of a hydraulic motor (which in some embodiments may function as a pump or a motor in alternative operating modes). EP 1537333 introduced the possibility of active cycles in which only part of the maximum displacement of an individual cylinder was selected (part mode cycles).

SUMMARY OF THE INVENTION

According to a first aspect of the present invention there is provided a method of determining one or more properties of a hydraulic apparatus, the apparatus comprising a hydraulic machine and a hydraulic circuit region in hydraulic communication with the hydraulic machine, the hydraulic machine being controllable to displace pulses of hydraulic fluid into or out of the hydraulic circuit region, the method comprising controlling the hydraulic machine to displace one or more pulses of hydraulic fluid of known volume into or out of the hydraulic circuit region, making at least one measurement of the response of part of the hydraulic apparatus to the said one or more pulses and determining the one or more properties of the hydraulic apparatus from the measured response.

The invention uses the response of part of the hydraulic apparatus to the one or more pulses of hydraulic fluid to measure relevant properties of the hydraulic circuit region or other parts of the apparatus. Pulses of hydraulic fluid will have effects on the hydraulic circuit region, parts which are driven by or drive the hydraulic circuit region, and also on parts which are coupled to the hydraulic machine (e.g. coupled to the rotatable shaft of the hydraulic machine). The pulses of hydraulic fluid are discrete, enabling the effect of each to be distinguished. They are of known volume, enabling the effect of each to be used to make accurate measurements of properties of the hydraulic apparatus. A pulse of hydraulic fluid displaced into or out of the hydraulic circuit region will lead to an increase or decrease respectively in the pressure in the hydraulic circuit region, having both sustained effects (due to the changed pressure) and impulse effects (due to the actual change in pressure). Similarly, the act of displacing a pulse of fluid will lead to a pulse of torque in a rotatable shaft of the hydraulic machine which will lead to impulse effects in connected components (and potentially also a change in the sustained torque exerted by the hydraulic machine which typically depends on the pressure in the high pressure circuit region).

The hydraulic apparatus may for example be a renewable power generator (for example, a wind turbine generator or a tidal power generator) or a vehicle, or a hydraulic transmission of a renewable power generator or a vehicle. The hydraulic apparatus may be a hydraulic machine, typically an industrial hydraulic machine such as an injection moulding machine or a hydraulically powered robot.

The part of the hydraulic apparatus, the response of which is measured, may be the hydraulic circuit region. For example, at least one said measurement may be a measurement of the pressure in the hydraulic circuit region. The part of the hydraulic apparatus, the response of which is measured, may be the hydraulic machine, or a part which is coupled to the hydraulic machine. The hydraulic machine typically comprises a rotatable shaft (which rotates in use), rotation of which is coupled to the displacement of hydraulic fluid by the hydraulic machine. The part of the hydraulic apparatus, the response of which is measured, may be the rotatable shaft, or a part which is coupled to the hydraulic machine through the rotatable shaft, for example, the blades of a turbine (e.g. a tidal turbine or wind turbine), an engine (e.g. electrical engine), a gearbox, a clutch, an electricity generator or other part which is coupled to the hydraulic machine through the rotatable shaft etc.

Accordingly, the one or more properties may be properties of the hydraulic circuit region. It may be that the measured response of the hydraulic apparatus is a measured response of a part of the hydraulic circuit region, for example, the pressure of hydraulic fluid within the hydraulic circuit region.

However, the one or more properties may be properties of a part which is coupled to the said hydraulic machine, for example, the drive shaft of said hydraulic machine or a part coupled to said hydraulic machine through a drive shaft. It may be that the measured response of the hydraulic apparatus is a measured response of the drive shaft of said hydraulic machine or a part which is coupled to the said hydraulic machine through a drive shaft.

It may be that the at least one measurement is of a parameter related to the change in the pressure in the hydraulic circuit region due to the said displacement of one or more said pulses of hydraulic fluid of known volume into or out of the hydraulic circuit region.

The said pressure changes caused by the displacement of pulses of hydraulic fluid may be determined at a plurality of different pressures (for example, across a range of pressures). It is therefore possible to determine one or more properties of the pressurised hydraulic circuit region which vary with the pressure (of the hydraulic fluid) in the hydraulic circuit region. As we will describe, this enables important properties of the hydraulic circuit region to be determined, for example enabling a hydraulic circuit which comprises the hydraulic circuit region to be better monitored or controlled. The invention also extends to determining one or more properties of mechanical parts which drive or are driven by the hydraulic circuit region.

Furthermore, by using a hydraulic machine which displaces pulses of hydraulic fluid of known volume into or out of the hydraulic circuit region, this provides step changes in the pressure in the hydraulic circuit region which facilitates measurement. The nature of these step pressure changes means they can be distinguished from the changes in pressure arising from leaks of hydraulic fluid, which could otherwise defeat accurate measurement. Typically, the hydraulic circuit region is subject to at least some leakage of hydraulic fluid.

The method may comprise, at each of a plurality of different pressures in the hydraulic circuit region, controlling the hydraulic machine to displace one or more pulses of hydraulic fluid of known volume into or out of the hydraulic circuit region and determining a parameter related to the change in the pressure in the hydraulic circuit region due to the said displacement of one or more said pulses of hydraulic fluid of known volume into or out of the hydraulic circuit region. The resulting parameter (or data derived therefrom) may be stored with reference to the pressure in the hydraulic circuit region (or a parameter related to said pressure) when the measurements were taken, for example, as a table.

The parameter related to the change in the pressure in the hydraulic circuit region may be the change in the pressure in the hydraulic circuit region. The measurements may comprise measurements of the pressure in the hydraulic circuit region. The hydraulic circuit region may comprise a pressure sensor which may in turn be used to measure the pressure of the hydraulic fluid within the hydraulic circuit region. The pressure sensor may be in direct contact with the hydraulic fluid. The pressure sensor may comprise a piezoelectric pressure sensor or acoustic pressure sensor or similar. The pressure sensor may measure deformation of a mechanical part of the hydraulic circuit region which is a function of pressure, for example the pressure sensor may comprise a strain gauge which measures deformation of a pipe which defines part of the hydraulic circuit region, which deformation is a function of the pressure within the hydraulic circuit region. Such a pressure sensor may compensate for temperature variations. The parameter related to the change in the pressure in the hydraulic circuit region may therefore be a numerical value (in any appropriate units) representing the change in measured pressure due to displacement of one or more said pulses of hydraulic fluid of known volume.

However, the parameter related to the change in pressure may be a parameter which is related to the change in the pressure in the hydraulic circuit region but which is not the change in pressure per se, for example the change in the speed of rotation of, or the torque acting on, the said rotating shaft of the hydraulic machine is typically related to the pressure in the hydraulic circuit region (the torque exerted on the hydraulic machine shaft is proportional to the pressure) and so changes in the speed of rotation, or the torque, may be parameters related to the change in pressure. Thus, the one or more measurements may be measurements of the speed of rotation of, or the torque acting on, the rotating shaft of the hydraulic machine or another part which rotates with the rotating shaft.

Another example of a parameter related to the change in the pressure in the hydraulic circuit region is a change in the position of an actuator driven by the hydraulic fluid in the hydraulic circuit region, for example, a change in the position of a ram driven by the hydraulic fluid.

The parameter related to the change in the pressure in the hydraulic circuit region (in response to the displacement of the one or more pulses of hydraulic fluid) may therefore be a change in the rotational speed of mechanical parts connected to the rotatable shaft of the hydraulic machine or of the further hydraulic machine. Such a parameter may be used to measure or deduce the pressure within the hydraulic circuit region, and the change in pressure within the hydraulic circuit region. For example, a measurement may be made of the torque on and/or speed of rotation of a rotating shaft which drives or is driven by the hydraulic machine, or of a rotating part which is coupled to the hydraulic machine by a rotating shaft (for example, a gearbox shaft or a motor which drives the hydraulic machine through a rotating shaft, or the wheels of a vehicle or rotor of an electricity generator which is driven by the hydraulic machine). Said measurement may be made by a rotational speed sensor.

The measurements of a parameter related to the change in pressure, at different pressures, enable hydraulic stiffness properties of the hydraulic circuit region to be determined. Accordingly, one or more said properties of the hydraulic apparatus may be hydraulic stiffness properties of the hydraulic circuit region. The one or more hydraulic stiffness properties of the hydraulic circuit region may comprise or consist of one or more parameters related to (e.g. measurements of) the change in pressure of hydraulic fluid within the hydraulic circuit region in response to the displacement of a defined volume of hydraulic fluid flowing into or out of the hydraulic circuit region, at a given pressure of hydraulic fluid within the hydraulic circuit region.

The one or more hydraulic stiffness parameters may comprise a data structure (e.g. a table), stored on a computer readable tangible storage medium (e.g. a memory). The stiffness parameters may be calculated from measurements relating to (for example measurements of) changes in measured pressure caused by the displacement of one or more said pulses of hydraulic fluid. The stiffness parameter calculations may also be calculated from values representative of the pressures at which the pulses were displaced (e.g. measurements of the pressure before, or after, respective pulses or an average (e.g. mean) thereof). The data structure may further comprise a measurement of a volume of hydraulic fluid, the displacement of which caused the respective change in pressure. However this is not essential, e.g. if the volume displaced is always the same.

Although in embodiments of the invention in which hydraulic stiffness properties of the hydraulic circuit region are measured, the pulses are made at a plurality of different pressures. However, measurements of the response of parts of the hydraulic apparatus to torque pulses transmitted through the rotatable shaft of the hydraulic machine can be made without varying the pressure in the hydraulic circuit region. For example, the hydraulic machine might be operated in a pressure control mode in which the volume of pulses of hydraulic fluid is selected to regulate the pressure in the hydraulic circuit region. Accordingly, properties of a part which is coupled to the said hydraulic machine, for example, the drive shaft of said hydraulic machine or a part coupled to said hydraulic machine through a drive shaft may be made while the pressure in the hydraulic circuit region is regulated to remain substantially constant.

Stiffness properties of the hydraulic circuit region may, for example, be measurements of the compliance of the hydraulic circuit region (which will vary with the pressure in the hydraulic circuit region) or a mechanical part of the hydraulic circuit region. Such a part may be in continuous or discontinuous mechanical communication with the hydraulic circuit region. However, the determined properties of the hydraulic circuit region can also concern the status and or state of parts of the hydraulic circuit region which affect the stiffness of the hydraulic circuit region, for example, whether or not there is damage to an accumulator, or a pressure relief valve.

Within this specification and the appended claims, by hydraulic compliance we refer to the ratio of the change in volume of the hydraulic fluid contained within the hydraulic circuit region to the change in pressure of hydraulic fluid within the hydraulic circuit region, i.e. dV/dP, for a given pressure of hydraulic fluid within the hydraulic circuit region, where V is the volume of hydraulic fluid contained within the hydraulic circuit region and P is the pressure of hydraulic fluid within the hydraulic circuit region. dV/dP varies with the pressure in the hydraulic circuit region. The reciprocal of this, dP/dV at a given P is referred to as hydraulic stiffness. Hydraulic compliance may be said to be on a scale of hydraulic stiffness, and hydraulic stiffness is on a scale of hydraulic compliance. Effectively they are opposites and to simplify the language of the specification we shall refer predominantly to hydraulic stiffness.

If a hydraulic circuit region was defined by perfectly rigid walls, a measurement of hydraulic stiffness would reflect only the compressibility of the hydraulic fluid ('bulk modulus'). A hydraulic circuit region will in practice be defined/confined/contained by mechanical parts which are resilient. Thus, the hydraulic stiffness also reflects the mechanical properties (including but not limited to mechanical stiffness) of the mechanical parts physically connected to/interfacing the hydraulic circuit region which retain/confine/contain the hydraulic fluid.

As we will explain, we have found that the invention enables physical properties of different mechanical parts of the hydraulic circuit region, each of which is in contact with the same continuous body of hydraulic fluid, to be individually determined from measurements made at different pressures of hydraulic fluid within the hydraulic circuit region.

The method may comprise processing the determined pressure changes (associated with the displacement of a known volume of hydraulic fluid) and measurements of the pressure in the hydraulic circuit region at different times to calculate a parameter relating to the rate of leakage of hydraulic fluid from the hydraulic circuit region.

The method may comprise processing the determined pressure changes (associated with the displacement of a known volume of hydraulic fluid) and measurements of the pressure in the hydraulic circuit region at different times to allow for the effect of leakage of hydraulic fluid from the hydraulic circuit region on the measured hydraulic stiffness parameter.

It may be that the measured pressure is monitored for a period of time, between or across consecutive displacement of pulses of hydraulic fluid to thereby measure the rate of leakage of hydraulic fluid from the hydraulic circuit region.

The method may comprise providing a measurement of the said parameter relating to the rate of leakage and/or indicating if the said parameter relating to the rate of leakage exceeds a threshold. The rate of leakage will depend on the pressure in the hydraulic circuit region and so the parameter relative to the rate of leakage might be pressure dependent or corrected for pressure.

The method may comprise using said measurement of the rate of leakage when subsequently determining the one or more properties of the hydraulic circuit region.

It may be that a measurement of pressure in the hydraulic circuit region is made and then a group of one or more pulses of hydraulic fluid are displaced into or out of the hydraulic circuit region and then no hydraulic fluid is displaced into or out of the hydraulic circuit by the hydraulic machine for a period of time and then the pressure in the hydraulic circuit region is measured again to determine the change in pressure. The period of time enables the pressure in the hydraulic circuit region to substantially stabilise. Otherwise the pressure changes may be inaccurate due to dynamic and/or oscillatory responses ("ringing") of the pressure in the hydraulic circuit region resulting from the displacement of pulses of hydraulic fluid. It may be that the measured pressure in the hydraulic circuit region is the stable pressure and not, for example, an oscillatory response or transient pressure wave.

Where a pressure sensor is provided for measuring the pressure in the hydraulic circuit portion, it may be proximal the hydraulic machine, in order to measure the pressure of the hydraulic fluid close to where it leaves or enters the hydraulic machine.

Preferably, the hydraulic circuit region is pressurised, i.e. it is at a pressure which is different to ambient (atmospheric) pressure. Preferably, the hydraulic circuit region is closed, except optionally for leakage. Preferably, the only hydraulic fluid which enters or leaves the hydraulic circuit region during the (test) method is the said pulses of fluid of known volume and any leakage which may be present. Typically, the hydraulic circuit region comprises a continuous, contained body of hydraulic fluid (without, for example, interruption by valves, although the hydraulic machine typically comprises an outlet valve through which hydraulic fluid can be introduced into the hydraulic circuit region). Typically, the static pressure of hydraulic fluid within the hydraulic circuit region is substantially the same throughout the hydraulic circuit region, though pressure waves may lead to dynamic variations within the region.

The hydraulic circuit region may comprise a mechanical part, e.g. an accumulator. The accumulator having a hydraulic fluid retaining volume in contact with a resilient compartment having a precharge pressure (i.e. a minimum pressure of the gas containing compartment, selectively set when the hydraulic fluid in the hydraulic fluid retaining volume is at ambient (atmospheric) pressure). The resilient compartment may be a fluid containing compartment, for example it may contain a gas. The resilient compartment may contain or be a solid, for example it may comprise or be a foam.

It may be that the hydraulic circuit region is in hydraulic communication with one or more further said hydraulic machines which are controllable to displace pulses of hydraulic fluid into or out of the hydraulic circuit region. The method may comprise, at each of a plurality of different pressures in the hydraulic circuit region, controlling one or both of the hydraulic machines to displace one or more pulses of hydraulic fluid of known volume into or out of the hydraulic circuit region. The method also comprises determining a parameter related to the change in the pressure in the hydraulic circuit region due to the said displacement of one or more said pulses of hydraulic fluid of known volume into or out of the hydraulic circuit region.

For example, it may be that the hydraulic circuit region is part of a hydraulic transmission and comprises a hydraulic line which extends between a said hydraulic machine (first hydraulic machine) and a further pump/motor/pump-motor (second hydraulic machine), or between two (or more) said hydraulic machines. In the instance of two such machines, the hydraulic line may therefore transmit fluid power from a first said hydraulic machine to a second said hydraulic machine. One said hydraulic machine may be coupled to a prime mover, e.g. an electrical or internal combustion motor (for example, in a vehicle) or to a turbine driven by a renewal energy source (e.g. in a wind turbine). The other machine may be coupled to a load, e.g. wheels or another actuator (for example, in a vehicle) or an electrical generator (e.g. in a wind turbine). It may be that one said hydraulic machine is controlled to displace one or more pulses of hydraulic fluid into the hydraulic circuit portion and another is controlled to displace one or more pulses of hydraulic fluid out of the hydraulic circuit portion. I.e. one machine may supply fluid to the other. In the context of a transmission comprising two such machines, a first machine will supply high pressure fluid to the second machine, whilst the second machine will subsequently transmit low pressure fluid to the first machine.

The hydraulic machine is typically a positive displacement machine, and is typically a variable displacement machine. Typically, the volume of the hydraulic fluid pulses is variable. It may be variable in the sense of providing full displacement contributing strokes, mixed with zero displacement contributing strokes and may also be variable in the sense that a contributing stroke may be controlled to be of a selected volume. Typically, the volume of the hydraulic fluid pulses is controlled. The method may therefore comprise selecting the volume of the one or more pulses of hydraulic fluid. Where there are a plurality of pulses of hydraulic fluid, they may have a plurality of different known volumes. The different known volumes may, for example, vary by more than 10% or more than 100%.

The hydraulic machine (and optionally the said further hydraulic machine, where present) typically comprises a rotatable shaft, one or more working chambers (e.g. cylinders, within which pistons reciprocate in use) having a volume which varies cyclically with rotation of the rotatable shaft, each working chamber having a low pressure valve which regulates the flow of hydraulic fluid between the working chamber and a low pressure line and a high pressure valve which regulates the flow of hydraulic fluid between the working chamber and a high pressure line. In this case, at least the low pressure valves (and in some embodiments also the high pressure valves) are electronically controlled valves, and the method typically comprises controlling the electronically controlled valves in phased relationship with cycles of working chamber volume to thereby determine the net displacement of hydraulic fluid by each working chamber on each cycle of working chamber volume. These are an example of synthetically commutated hydraulic machines.

Typically the method comprises controlling the electronically controlled valves to select between inactive cycles in which a working chamber makes no net displacement of hydraulic fluid (between the low and high pressure lines or vice versa) and active cycles in which a working chamber makes a net displacement of hydraulic fluid (between the low and high pressure lines or vice versa).

By active control we include the possibility of a valve being actively opened, actively closed, actively held open or actively held closed. A valve may be biased open (normally open) or closed (normally closed). An actively controlled valve may also move passively in some circumstances. For example, a LPV may be actively closed but open passively when the pressure in a cylinder drops below the pressure in the low pressure manifold.

Said control of electronically controlled valves is typically carried out by a controller, which comprises a processor in electronic communication with a solid state memory which stores a computer program. Typically, the electronically controlled valves are controlled to cause the net displacement by the working chambers to meet a demand, which typically varies in use.

In some embodiments, the fluid working machine comprises a plurality of working chambers which are connected to the same hydraulic circuit region. It may be that a plurality of working chambers connected to the same hydraulic circuit are controlled together (for example to meet a demand which relates to their combined displacement). Thus, it may be that the pulses are displaced into or out of the hydraulic circuit region by a plurality of said working chambers.

Typically, the hydraulic circuit region is in fluid communication with the said high pressure line or the said low pressure line. Thus, the hydraulic machine typically displaces hydraulic fluid into or out of the hydraulic circuit region.

Such hydraulic machines are suitable for the invention because they displace hydraulic fluid in discrete pulses from working chambers and the volume of fluid which is dispensed is known as it is determined by the timing of active control of the electronically controlled valves and the period of cycles of working chamber volume (which depends on the speed of rotation of the rotatable shaft). The displacement of discrete portions of hydraulic fluid from individual working chambers may overlap to form the discrete pulses, depending for example on the phase difference between the working chambers and the fraction of maximum rate of displacement at which the hydraulic machine works.

Such hydraulic machines also have the advantage that the timing of the displacement of the pulses of hydraulic fluid can be known very accurately (as it depends on the phase of the working chamber volume cycles and the timing of active control of the electronically controlled valves). This allows the response of the pressure in the hydraulic circuit region to be resolved from the effect on pressure in the hydraulic circuit region of leakage.

Another advantage of such hydraulic machine is the avoidance of leak back, due to the active control of the high and low pressure valves, and especially the (active or passive) robust check valve nature of the high pressure valve.

The hydraulic machine may be a pump, or a motor, or operable as either a pump or a motor (so called 'pump-motor'). Typically, the said high pressure valves are also electronically controlled valves controlling the electronically controlled valves comprises controlling the high pressure valves. Nevertheless, in a machine operable only as a pump, the high pressure valves may be passively opening check valves. It may carry out simultaneous functions, in different portions of the machine, specifically some cylinders may pump, whilst others motor, and others may idle.

Each pulse has and creates an impulse characteristic, and has a clear start and finish point (defined by valve opening and closings). The hydraulic fluid pulses create a mechanical pulse, specifically an impulse, as the rotational speed and/or torque on the shaft forming part of the hydraulic machine increases or decreases.

Typically, active and inactive cycles are interspersed with each other. Typically, at all rates of displacements by the hydraulic machine which are less than the maximum rate of displacement by the hydraulic machine, at least some cycles of working chamber volume are full mode active cycles, being active cycles in which the working chambers displace the maximum amount of hydraulic fluid that the working chambers displace during normal operation in given conditions (e.g. pressure, temperature etc). The hydraulic machine typically comprises a phase sensor to determine the phase of the cycles of working chamber volume, for example a shaft position sensor which senses the angular position of the rotatable shaft.

In some embodiments, the hydraulic circuit region is part of a hydraulic transmission and extends between the high pressure line of the hydraulic machine (the first hydraulic machine) and the high pressure line of a further hydraulic machine (the second hydraulic machine). The hydraulic transmission also extends between the low pressure lines of the first and second hydraulic machines. It may be that each hydraulic machine is as previously described, each comprising a rotatable shaft, one or more working chambers (e.g. cylinders) having a volume which varies cyclically with rotation of the rotatable shaft, each working chamber having a low pressure valve which regulates the flow of hydraulic fluid between the working chamber and a low pressure line and a high pressure valve which regulates the flow of hydraulic fluid between the working chamber and a high pressure line. At least the low pressure valves are electronically controlled valves, and the method comprises controlling the electronically controlled valves in phased relationship with cycles of working chamber volume to thereby determine the net displacement of hydraulic fluid by each working chamber on each cycle of working chamber volume.

In some embodiments, the rotatable shaft of the first said hydraulic machine is coupled to a turbine for receiving energy from a renewable energy source (e.g. from the wind or the tide) and the rotatable shaft of the second said hydraulic machine is coupled to an electricity generator.

In some embodiments, the rotatable shaft of the first said hydraulic machine is coupled to an electrical motor and the rotatable shaft of the second said hydraulic machine is coupled to the rotatable shaft of one or more wheels, rams or other actuators.

Typically, the hydraulic fluid displaced into or out of the hydraulic circuit region is not measured by a flow meter. This is not required with a machine of the said type.

The method may be carried out as a test procedure (e.g. a stiffness test). The method may be carried out while the hydraulic apparatus is in a test mode. The test procedure may be triggered by start-up of the hydraulic machine. The test procedure may be carried out when the hydraulic apparatus is not in an operating mode. The test procedure may be carried out before the hydraulic apparatus enters an operating mode. The test procedure may be carried out responsive to determination that there has been a change in the configuration of the hydraulic circuit region (e.g. opening or closing of a valve connecting the hydraulic circuit region to a hydraulic fluid conduit). The test procedure may be started when the hydraulic machine meets one or more criteria, including a criterion that the hydraulic machine is in a quiescent state (e.g. if the hydraulic apparatus is a vehicle transmission, that the vehicle is parked; if the hydraulic apparatus is a renewable energy generator comprising an electrical generator, that electricity is not being generated). The test procedure may, if required, be preceded and/or followed, by a step of reducing the pressure in the hydraulic circuit region, e.g. to below a threshold. Pressure reducing means may be provided. The test procedure may, if required, be preceded and/or followed, by a step of increasing the pressure in the hydraulic circuit region, e.g. to above a threshold. Pressure increasing means may be provided.

The rate at which hydraulic fluid is displaced into (or out of) the hydraulic circuit region (e.g. during an individual test) may be varied with pressure. The rate at which hydraulic fluid is displaced into (or out of) the hydraulic circuit region (e.g. during an individual test) may initially be relatively low and the rate may be increased responsive to determination that the hydraulic stiffness of the hydraulic circuit portion meets one or more criteria (e.g. is below a threshold).

The one or more said pulses of hydraulic fluid of known volume may initially comprise single pulses of hydraulic fluid of less than the maximum stroke volume of an individual working chamber, for example less than 50% or less than 25% of the maximum stroke volume of an individual working chamber, and the total volume of the one or more pulses of hydraulic fluid may subsequently be increased, for example, to single pulses of hydraulic fluid of a greater fraction of the maximum stroke volume of an individual working chamber or to single pulses of the maximum stroke volume of an individual working chamber or to a volume which is greater than the maximum stroke volume of an individual working chamber (an amount which will require hydraulic fluid from two or more different working chambers).

The change in pressure in the hydraulic circuit region due to said displacement of one or more said pulses of hydraulic fluid is typically determined predominantly by the deformation of different parts (of the hydraulic circuit region or the hydraulic fluid itself) at different pressures. The method may therefore comprise determining the said parameter related to the change in pressure at a plurality of pressures which fall within at least two or at least three different ranges of pressure at which the change in pressure is determined predominantly by the deformation of different parts. Typically at least two of the different parts are parts which define the hydraulic fluid region. At least one of the parts may however be the hydraulic fluid itself or a gas (e.g. gas bubbles/entrained gas) present in the hydraulic fluid. Thus, properties of at least two, or at least three different parts may be determined. It is clear to one skilled in the art that references to 'gas' include mixtures of gas, such as air which comprises various elements.

The method may comprise processing the measurements made at a plurality of different pressures and/or speeds or torques to determine at least one of, at typically at least two or at least three of:
(a) a parameter related to the hydraulic stiffness of the hydraulic fluid arising from the presence of gas in the hydraulic fluid in the hydraulic circuit region. This hydraulic stiffness may arise, for example, from the presence of dissolved gas, or gas bubbles/entrained gas. The gas may be air. This parameter may be a measure of the concentration of the gas in the hydraulic fluid;
(b) a parameter related to the hydraulic stiffness of hydraulic fluid retaining parts (e.g. manifolds, galleries, pipes or hoses) of the hydraulic circuit region;
(c) a parameter related to the precharge pressure of a said resilient compartment of an accumulator which is part of the hydraulic circuit region;
(d) a parameter related to the hydraulic stiffness of a said resilient compartment of an accumulator which is part of the hydraulic circuit region;
(e) the pressure above which a pressure relief valve opens (to relieve pressure).

The method may comprise displacing hydraulic fluid into the hydraulic circuit portion to increase the pressure in the hydraulic circuit portion and measuring two or more of parameters (a) through (d) at different pressures. The method may comprise displacing hydraulic fluid out of the hydraulic circuit portion to decrease the pressure in the hydraulic circuit portion and measuring two or more of parameters (a) through (d) at different pressures.

The method may comprise measuring parameter (b) at a higher pressure than parameter (a). The method may comprise measuring parameter (c) at a higher pressure than parameter (b). The method may comprise measuring parameter (d) at a higher pressure than parameter (b).

Accordingly, the invention may comprise measuring (c) a parameter related to the precharge pressure of a said resilient compartment of an accumulator which is part of the hydraulic circuit region. This step may comprise determining the pressure above which the change in pressure due to the said displacement of one or more said pulses of hydraulic fluid of known volume into or out of the hydraulic circuit region drops, due to deformation of the resilient compartment. If the resilient compartment has broken (e.g. if the resilient compartment is a gas containing compartment and gas has leaked out) the pressure above which said change in pressure decreases due to deformation of the resilient compartment will be substantially reduced.

Accordingly, the invention may comprise measuring (d) a parameter related to the hydraulic stiffness of a said resilient compartment of an accumulator which is part of the hydraulic circuit region. This step may comprise determining the variation with pressure (e.g. gradient) of the change in pressure due to the said displacement of one or more said pulses of hydraulic fluid of known volume into or out of the hydraulic circuit region drops, due to deformation of the resilient compartment. If the resilient compartment has broken (e.g. if the resilient compartment is a gas containing compartment and gas has leaked out) the gradient of change in hydraulic stiffness with pressure will be increased in the range of pressures at which the resilient compartment is the main factor determining the hydraulic stiffness.

The invention may comprise measuring a parameter relating to the magnitude, duration or frequency spectrum of pressure waves arising within the accumulator in response to the fluid pulses. This is especially relevant where the accumulator is a piston accumulator.

The method may further comprise the steps of determining that a fault has occurred in the hydraulic circuit region and indicating that the fault has occurred. The fault may be determined from said measurement (a), (b), (c), (d) or (e). For example, the fault may be that there is a leak in the hydraulic circuit region or that the amount of leakage in the hydraulic circuit region exceeds a threshold (determined from said measurement of (b) a parameter related to the hydraulic stiffness of manifolds or hoses of the hydraulic circuit region), or that there is a fault with a said accumulator, for example that the precharge pressure is excessively high or low. If the accumulator precharge pressure is too low that indicates damage to the resilient compartment of the accumulator. The invention enables thereby damage to the resilient compartment of the accumulator to be distinguished from leakage of hydraulic fluid from the hydraulic circuit region.

The method may comprise measuring hysteresis in the response of the hydraulic circuit region (and optionally parts which supplied hydraulic fluid to or which receive hydraulic fluid from the hydraulic circuit region). This can be carried out by determining the parameter related to the change in the pressure caused by repeatedly displacing one or more pulses of hydraulic fluid into the hydraulic circuit region and determining the parameter related to the change in the pressure caused by repeatedly displacing one or more pulses of hydraulic fluid out of the hydraulic circuit region, and comprising the two. Such hysteresis may arise from e.g. friction in a piston accumulator or an obstruction or blockage in an accumulator containing a resilient (typically gas or foam filled) compartment. The hysteresis measurement is best carried out quickly, e.g. predominantly adiabatically.

The method may further comprise the steps of storing the one or more properties. The one or more properties may be measured repetitively in order to monitor the hydraulic circuit region.

The method may comprise commanding a valve to open or close (e.g. using an electronic actuator) which valve regulates the flow of hydraulic fluid into or out of the hydraulic circuit region. The opening or closing of such a valve should affect hydraulic stiffness and so failure of an expected change in hydraulic stiffness to occur would indicate a fault in the valve.

Therefore, in some implementation of the inventions, the response of the pressure in the hydraulic circuit region to the one or more pulses is used to determine one or more properties of a part of the hydraulic apparatus which is not part of the hydraulic circuit region, for example a part which is, or which is coupled to the hydraulic machine, or which is driven by or drives the hydraulic circuit region.

The response which is measured may, however, be the response of something other than the pressure in the hydraulic circuit region. For example, the response may be a mechanical response such as movement of a part, which may be a change in the position of a part, a change in the speed of rotation of a part, a change in the vibration of a part. Said part may for example, be the rotatable shaft of the hydraulic machine, or a part coupled to the said hydraulic machine through the rotatable shaft, for example, a turbine, the blades of a turbine, an electrical motor, an electrical generator etc. Said part may be an actuator, or a part of an actuator, which is driven by or drives the hydraulic circuit region, for example a ram having a cylinder in fluid communication with the hydraulic circuit region.

The response which is measured may comprise a change in the speed of rotation of the rotatable shaft of the hydraulic machine of a part coupled to the said shafts.

At least one measurement may be made using a position sensor (e.g. which senses the position of an actuator) or a speed sensor (e.g. which sense the speed of rotation of a said rotatable shaft) or a vibration sensor or an accelerometer.

The response may be an electrical response, for example the response (e.g. magnitude or phase) of the voltage or current (or power) in an electrical generator (e.g. within the coils of an electrical generator) or produced by an electrical generator which is coupled to the hydraulic circuit region by said hydraulic machine (e.g. through the said rotatable shaft of the hydraulic machine), or the electrical stiffness of a generator. Accordingly, the measurements may be measurement of the voltage, current, power and/or phase of an electrical signal or of the electrical stiffness of a generator (the relationship between load angle and torque).

The method may comprise determining one or more properties of the circumstances in which slip occurs in between parts coupled to the rotatable shaft of the hydraulic motor, for example the maximum torque which can be applied through the drivetrain without slip occurring. Slip may be slip within a clutch coupled to the rotatable shaft of the hydraulic machine (and thus entrained with the shaft, but not directly connected to that shaft) or a belt driven by or which drives the rotatable shaft.

It should be noted that although the speed of rotation of the hydraulic shaft may be linked to the pressure in the hydraulic circuit region, this is not always the case, for example if a pressure relief valve is open and the pressure in the hydraulic circuit region is therefore limited to a threshold value, or if the hydraulic machine is operated in a pressure control mode in which the displacement is dynamically varied in order to achieve a desired pressure in the high pressure line.

The method may comprise detecting a fault. The fault may be a fault in the hydraulic circuit region. The fault may be a fault in the part of the machine other than the hydraulic circuit region, for example, a fault in a part which is coupled to (and typically drives or is driven by) the hydraulic circuit region. The fault may be detected by measuring the response of the hydraulic circuit region, e.g. by measuring a parameter related to the change in the pressure in the hydraulic circuit region.

The method may comprise detecting (and identifying) one or more of the following, and typically also differentiating between:

Bulging of the wall of an accumulator (which would lead to a reduction in hydraulic stiffness in the range of pressures where charging of the accumulator predominantly affects hydraulic stiffness (region 3 below));

Bulging of hoses (which would lead to a reducing in hydraulic stiffness in the range of pressures where the resilience of hoses and pipes predominantly affects hydraulic stiffness (region 2 below));

A reduction in the stiffness of hoses due to fatigue;

Partial or complete blockages within the hydraulic circuit region (which lead to an increase in hydraulic stiffness);

Failure of a valve to respond correctly to a command (this requires the additional step of commanding the valve to open or close and determining whether the hydraulic stiffness responds as expected);

A change in the pressure set point of a pressure relief valve (i.e. the pressure at which it opens);

Leakage which occurs only above a particular pressure (e.g. leakage from specific seals). This may include quantifying the amount of leakage or determining the pressure above which leakage occurs;

The failure of an actuator driven by hydraulic fluid from the hydraulic circuit region (e.g. the failure of a hydraulic ram or hydraulic motor driven by the hydraulic circuit region to move after a displacement). Failure of an actuator to move when expected can be determined from an increase in hydraulic stiffness. Failure of an actuator to reach the end of its travel (e.g. for a ram to reach the end of its travel) can be determined from the hydraulic stiffness not increasing again as expected;

An obstruction of an actuator driven by hydraulic fluid from the hydraulic circuit region (e.g. if movement of a hydraulic ram driven by hydraulic fluid from the hydraulic circuit region is obstructed this would lead to a greater hydraulic stiffness in the hydraulic circuit region than would otherwise be the case);

A break between the hydraulic fluid and air sides of an accumulator (e.g. the leakage of air into the hydraulic fluid can be detected from a reduced stiffness compared to an expected value at a pressure range at which the compressibility of the hydraulic fluid predominantly determines hydraulic stiffness (e.g. in region 1 below, or oil in the air side of an accumulator can be detected from an increased stiffness compared to an expected valve at a pressure range at which the resilience of the resilient compartment of an accumulator predominantly determined hydraulic stiffness));

An error in the composition of the hydraulic fluid (for example, that the wrong liquid is present or that there is contamination with air or oil). The composition of the hydraulic fluid predominantly determines the hydraulic stiffness at relatively low pressures.

The fault may be detected by measuring said response of something other than the pressure in the hydraulic circuit region. The method may comprise detecting one or more of the following:

- damage to a coupling, such as a coupling between the hydraulic machine, and another part (e.g. a motor, a turbine, a generator), for example arising from backlash,
- reduced strength of a coupling changing its stiffness,
- slippage from failure of a clamped connection to withhold the torque placed on that connection,
- failure of a mechanical linkage—e.g. belt, through change of inertia of the load coupled,
- backlash in a gearset, or cogging due to failure of a part,
- a bearing breaking, or becoming stuck,
- a fault in the prime mover, such that the speed is less closely regulated than it should be,
- excessive friction in the drivetrain,
- slipping of a clutch, which should be rigidly coupled & engaged, or the existence of drag in a clutch which is intended to be decoupled,
- the breakage of a cable connected to a winch, or tangling of a cable which is connected to a hydraulic machine,
- damage to brakes, which can be determined from excessive movement of a vehicle which is supposed to be slowed down by the said brakes, but is not responding as expected.

The method may comprise detecting failure of a wind turbine generator through breakage of a blade, or icing of a blade, causing a rise in inertia or change in resonant frequency of the blade. It would sense a pulse, expect a response in a measured parameter (e.g. speed of rotation of a turbine), but sense a different response.

In case of a generator in a wind turbine generator, the method may comprise determining a fault with the field current of the generator, which determines its electrical stiffness (the relation of the load angle and torque). If the generator fails, then the mechanical load angle of the load will respond excessively to a pulse of torque.

One or more of the properties of the hydraulic apparatus may be properties of the response, in the time domain, of the hydraulic circuit region, or of another part of the apparatus to the one or more pulses of hydraulic fluid. The one or more properties may be properties of the response, in the time domain, of the hydraulic circuit region, or of another part of the apparatus, to the one or more pulses of hydraulic fluid, at a plurality of different pressures in the hydraulic circuit region. By a response in the time domain we refer to the variation with time, including variation with frequency, of the response of the hydraulic circuit region, or of another part of the apparatus, to the one or more pulses of hydraulic fluid. Properties of the response in the time domain may therefore include an impulse response, frequency spectrum transfer function etc.

Typically, the method may comprise determining the variation in the properties of the response in the time domain with the pressure in the hydraulic circuit region.

The response may for example be the response in the time domain of the pressure in the hydraulic circuit region, as measured by a pressure sensor. The one or more properties may therefore be properties of the response in the time domain of the pressure in the hydraulic circuit region to the displacement of pulses of hydraulic fluid into or out of the hydraulic circuit region.

The invention therefore extends to a method of operating a hydraulic apparatus comprising a hydraulic circuit region, the hydraulic circuit region being in hydraulic communication with a hydraulic machine which is controllable to displace pulses of hydraulic fluid into or out of the hydraulic circuit region. The method may comprise, in a test mode, determining parameters of the frequency response of the pressure in the hydraulic circuit region to the displacement of pulses of hydraulic fluid into or out of the hydraulic circuit region. In a subsequent operating mode, the method may comprise taking into account the determined parameters of the frequency response of the pressure in the hydraulic circuit region when determining the timing or volume of the displacement of pulses of hydraulic fluid of known volume into or out of the hydraulic circuit region (by the said hydraulic machine or, optionally, a further said hydraulic machine which is also controllable to displace pulses of hydraulic fluid into or out of the hydraulic circuit region).

In order to obtain the said parameters of the frequency response, the pressure in the hydraulic circuit region is monitored for a period of time after the displacement of one or more pulses of hydraulic fluid into or out of the hydraulic circuit region. This is typically repeated for a plurality of displacements of a pulse of hydraulic fluid. Typically some of the pulses of hydraulic fluid have different volumes.

Nevertheless, the properties of the response, in the time domain, may be properties of the response of a part of the hydraulic apparatus other than the hydraulic circuit region, for example the response may be a mechanical response such as movement of a part, which may be a change in the position of a part, a change in the speed of rotation of a part, a change in the vibration of a part. Said part may for example, be the draft shaft of the hydraulic machine, or a part coupled to the said hydraulic machine through the drive shaft, for example, a turbine, the blades of a turbine, an electrical motor, an electrical generator etc. Said part may be an actuator, or a part of an actuator, which is driven by or drives the hydraulic circuit region, for example a ram having a cylinder in fluid communication with the hydraulic circuit region.

The response which is measured may comprise a change in the speed of rotation of the rotatable shaft of the hydraulic machine, or of a part coupled to the said shafts.

At least one measurement may be carried out be a position sensor (e.g. which senses the position of an actuator) or a speed sensor (e.g. which sense the speed of rotation of a said rotatable shaft) or a vibration sensor or an accelerometer.

The response may be an electrical response, for example the response (e.g. magnitude or phase) of the voltage or current (or power) in an electrical generator (e.g. within the coils of an electrical generator) or produced by an electrical generator which is coupled to the hydraulic circuit region by said hydraulic machine (e.g. through the said rotatable shaft of the hydraulic machine). Accordingly, the measurements may be measurement of the voltage, current, power and/or phase of an electrical signal.

The parameters of the response in the time domain which are determined may comprise a transfer function. The parameters of the response in the time domain which are determined may comprise an impulse response. The parameters of the response in the time domain which are determined may comprise a frequency response (magnitude of response versus frequency). The parameters of the response in the time domain which are determined may comprise a phase response (phase shift versus frequency).

The pattern of active and inactive cycles of working chamber volume generated by the hydraulic machine (or further hydraulic machine, where present) will generate characteristic frequencies, which will change as the shaft speed of the hydraulic pump or motor, or the fraction of cycles of working chamber volume which are active cycles changes. The method may comprise selecting the time sequence of active and inactive cycles of working chamber volume carried out by the hydraulic machine (or further hydraulic machine) to avoid characteristic frequencies of the time sequence of active and inactive cycles of working chamber volume remaining at one or more peaks of the frequency response of hydraulic circuit region (for example the resonant frequency, if there is one), or of one or more other parts of the hydraulic apparatus. This reduces vibrations (and the potential for damage arising from resonant vibrations) during subsequent operation.

The method may further comprise controlling the said hydraulic apparatus taking into account the stored one or more properties, for example controlling the displacement of hydraulic fluid into or out of the hydraulic circuit region by the said hydraulic machine (and/or said further hydraulic machine, where present). Thus, the measured one or more properties may be taken into account to control the hydraulic apparatus (for example the hydraulic machine) in a subsequent operating mode of the hydraulic apparatus.

The method may further comprise controlling the displacement of the said machine to obtain a desired torque taking into account both the measured pressure and the said stored one or more properties. The desired torque may the torque of the rotatable shaft of the said hydraulic machine (and/or said further hydraulic machine, where present), or a part coupled to a said rotatable shaft (e.g. turbine, turbine blades, electrical motor, electrical generator, wheel).

Where the hydraulic circuit region is part of a hydraulic transmission, the method may further comprise controlling the pressure of the high pressure manifold of the said hydraulic transmission taking into account the stored one or more properties.

The invention extends in a second aspect to a method of operating a hydraulic apparatus comprising a hydraulic circuit region which is in fluid communication with a hydraulic machine which is controllable to displace pulses of hydraulic fluid into or out of the hydraulic circuit region. The method of the second aspect comprises, in a test mode, determining one or more properties of the region by the method of the first aspect of the invention and, in a subsequent operating mode, controlling the displacement of hydraulic fluid into or out of the hydraulic circuit region taking into account the determined one or more properties.

It may be that the hydraulic region is in communication with at least two said hydraulic machines which are controllable to displace pulses of hydraulic fluid into or out of the hydraulic circuit region. The method may comprise controlling a first said hydraulic machine to displace the said one or more pulses of hydraulic fluid of known volume into or out of the hydraulic circuit region to thereby determine the said parameter, and the subsequent control of the displacement of hydraulic fluid into or out of the hydraulic circuit region taking into account the determined one or more properties may comprise controlling a second said hydraulic machine. However, alternatively, or additionally, in the operating mode, control of the displacement of hydraulic fluid into or out of the hydraulic circuit region taking into account the determined one or more properties may comprise controlling the first said hydraulic machine.

It may be that, in the operating mode, the volume of hydraulic fluid which is displaced into or out of the hydraulic circuit region (by the said first and/or second hydraulic machines, as appropriate) is selected taking into account one or more said measured properties (for example, to obtain a target pressure in the hydraulic circuit region or to obtain a target movement of an actuator).

It may be that, in the operating mode, the volume of hydraulic fluid which is displaced into or out of the hydraulic circuit region (by the said first and/or second hydraulic machines, as appropriate) during individual cycles of working chamber volume, is selected taking into account one or more said measured properties. It may be that the decision (by a controller) whether to cause an individual working chamber to undergo an active cycle or an inactive cycle is selected taking into account one or more said measured properties. It may be that during at least some individual cycles of working chamber volume, the net displacement by an individual working chamber is selected taking into account one or more said measured properties and is neither no net displacement nor the maximum net displacement by the respective working chamber. It may be that during at least some individual cycles of working chamber volume, the timing of opening or closing of the low pressure valve and/or high pressure valve associated with a working chamber, within a cycle of working chamber volume, under the active control of a controller, is determined taking into account one or more said measured properties. It may be that the proportion of cycles of working chamber volume which are active cycles (i.e. in which there is a non-zero net displacement of hydraulic fluid), or the amount of hydraulic fluid displaced during active cycles, is lower where the hydraulic stiffness is higher, as indicated by a measured property related to the hydraulic stiffness of the hydraulic circuit region.

It may be that, in the operating mode, the volume of hydraulic fluid which is displaced into or out of the hydraulic circuit region (by the said first and/or second hydraulic machines, as appropriate) during an individual cycle of working chamber volume is calculated taking into account whether the pressure in the hydraulic circuit region is above or below a threshold pressure determined during the test mode, for example the threshold pressure may be the determined precharge pressure of an accumulator. For example, a first algorithm for selecting the net displacement of individual cycles of working chamber volume might be employed when the pressure in the hydraulic circuit region is below said threshold pressure and a second said algorithm might be employed when the pressure in the hydraulic circuit region is above said threshold pressure.

It may be that in the test mode, one or more operational limits of the hydraulic apparatus, for example of the hydraulic machine, are determined and in the operating mode the hydraulic apparatus, for example the hydraulic machine, is controlled to avoid exceeding the one or more operational limits. One or more operational limits may be a maximum torque above which a failure occurs, for example slip in a drivetrain connected to the rotatable shaft of the hydraulic machine (e.g. slip in a clutch).

The method may be carried out to determine one or more unknown properties of the hydraulic circuit region (for example to detect the presence of an accumulator or to measure the hydraulic stiffness of the hydraulic circuit region), for example, during an initial operating mode of the hydraulic apparatus or hydraulic machine. This enables operating parameters of the hydraulic apparatus (e.g. pressure control feedback signals) or hydraulic machine (e.g.

valve timings) to be calibrated and for the machine to be 'auto-tuned'. This is useful when the hydraulic machine is first used with a new hydraulic circuit region.

DESCRIPTION OF THE DRAWINGS

An example embodiment of the present invention will now be illustrated with reference to the following Figures in which:

FIG. 13 is a graph of a typical variation in stiffness (gross dP/dV) with Pmid.

DETAILED DESCRIPTION OF EXAMPLE EMBODIMENTS

Example 1—Hydraulic Stiffness of Wind Turbine Generator Transmission

In order to describe the invention we first describe, with references to FIGS. 1 to 5, the normal operation of a wind turbine generator with a hydraulic transmission, and we then discuss, with reference to FIGS. 6 to 15, the modifications required to carry out the present invention, including a test mode.

Wind Turbine Generator Structure and Normal Operating Function

Figure 1:
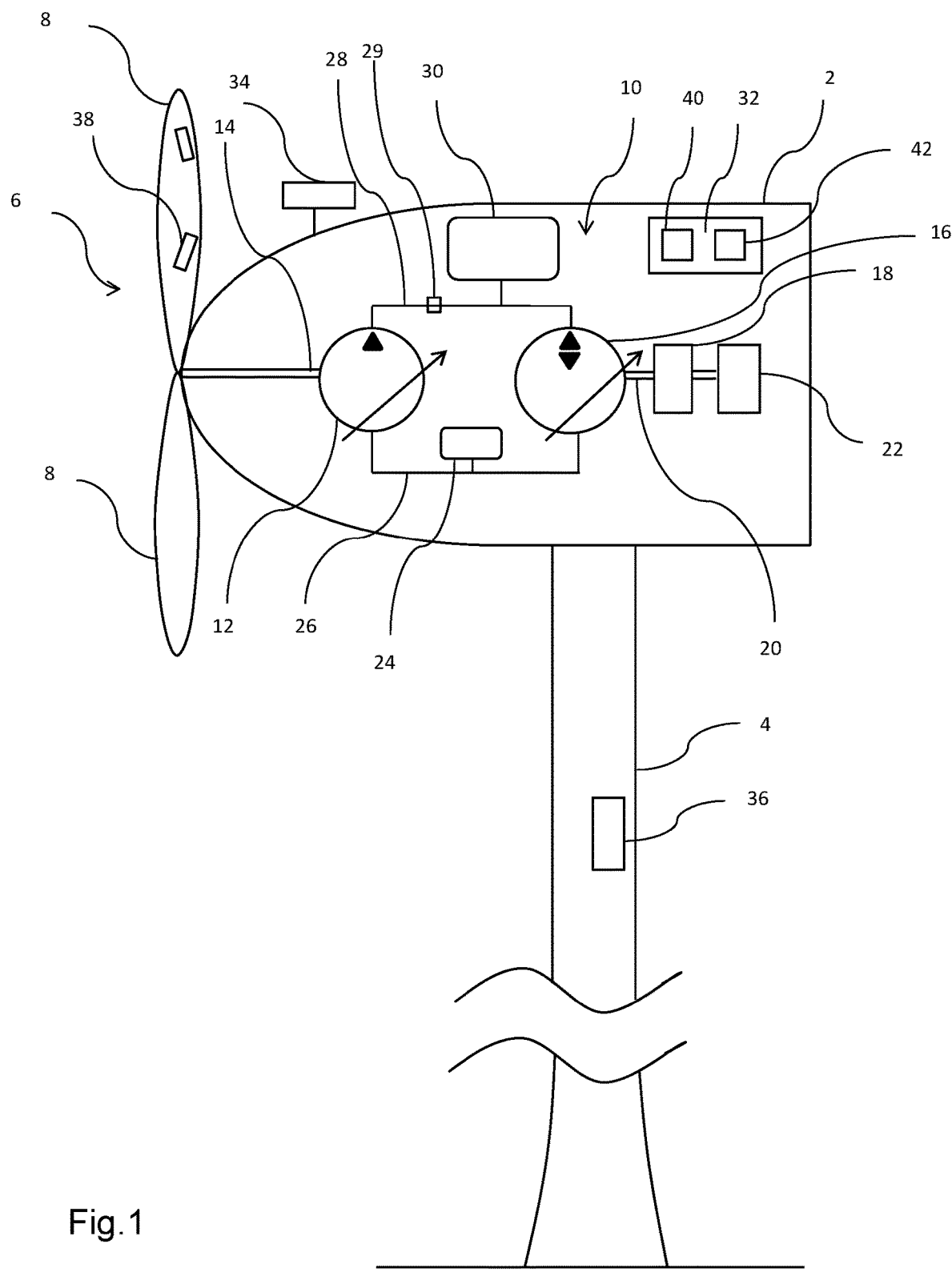
FIG. 1 is a schematic diagram of a wind turbine generator according to the invention.

With reference to FIG. 1, a wind turbine generator 1 comprises a tower nacelle 2, supported by a tower 4 and having a turbine 6, with a plurality of blades 8 mounted thereon.

The nacelle houses a hydraulic transmission, shown generally as 10, which comprises a hydraulic pump 12, which has the rotatable shaft that is coupled to the turbine through a drive shaft 14. The transmission also includes a hydraulic motor 16 which has the rotatable shaft that is coupled to an electricity generator 18 through a generator drive shaft 20. The electricity generator is in turn coupled to an electric grid through a contactor 22.

Within the hydraulic transmission, oil, functioning as hydraulic fluid, is supplied from a tank 24 to the input side of the hydraulic pump through low pressure hydraulic fluid line 26. Pressurised oil is delivered from an output side of the hydraulic pump to the input side of the hydraulic motor through high pressure hydraulic fluid line 28 which is in communication with an oleo pneumatic accumulator 30. The pressure in the high pressure hydraulic fluid line is sensed using a pressure sensor 29.

The nacelle also houses a transmission controller 32, which controls the hydraulic transmission by sending control signals to the hydraulic pump and motor, to regulate the displacement of the hydraulic pump and the hydraulic motor. The control signals (the displacement demand signals) demand displacement by the pump and motor, expressed as a fraction of maximum displacement (the displacement demand). The absolute volume of the displacement (volume of hydraulic fluid per second) will be the product of the fraction of maximum displacement, the maximum volume which can be displaced per revolution of the rotatable shaft of the pump or motor and the rate of revolution of the rotatable shaft or motor (revolution per second). This way, the transmission controller can regulate the torque applied through the drive shaft 14, which is proportional to the displacement (volume per second) of the hydraulic pump, and the pressure in the high pressure hydraulic fluid line. The transmission controller can also regulate the rate of electricity generation, which depends on the displacement (volume per second) of the hydraulic motor, and the pressure in the high pressure hydraulic fluid line. The pressure in the high pressure hydraulic fluid line increases when the hydraulic pump displaces oil at a higher displacement (volume per second) than the hydraulic motor, and decreases when the hydraulic motor displaces oil at a lower displacement (volume per second) than the hydraulic pump. The oleo-pneumatic accumulator allows the total amount of hydraulic fluid in the high pressure side to be varied. In alternative embodiments a plurality of hydraulic pumps and/or a plurality of hydraulic motors are in fluid communication with the high pressure fluid line and so the displacement of each must be considered.

The transmission controller receives, as inputs, signals including the speed of rotation of the rotatable shafts of the pump and motor, and a measurement of the pressure in the high pressure hydraulic fluid line. It may also receive a wind speed signal from an anemometer 34, information from the electricity grid, control signals (such as commands to start up or stop, or to increase or decrease high pressure hydraulic fluid line pressure in advance of a gust of wind), or other data as required.

The transmission controller also takes into account resonances within the wind turbine generator, such as resonances in the tower, which can be measured using an accelerometer 36, located in the tower, and vibrations in the turbine blades, which can be measured using an accelerometer, or strain gauge 38 mounted on one of the blades.

The transmission controller 32 comprises a single processor 40, in electronic communication with data storage 42, comprising a tangible computer readable medium, such as solid state memory, which stores the programme, and data required during operation. Machine controllers (not shown in FIG. 1) in the pump and motor, at least part of which functions as valve control modules, generate valve control signals responsive to requested displacement from the transmission controller. Nevertheless, one skilled in the art will appreciate that the control of the transmission can be implemented as a plurality of distributed computing devices, each of which may implement parts of the overall control functionality, or as a single device.

Figure 2:
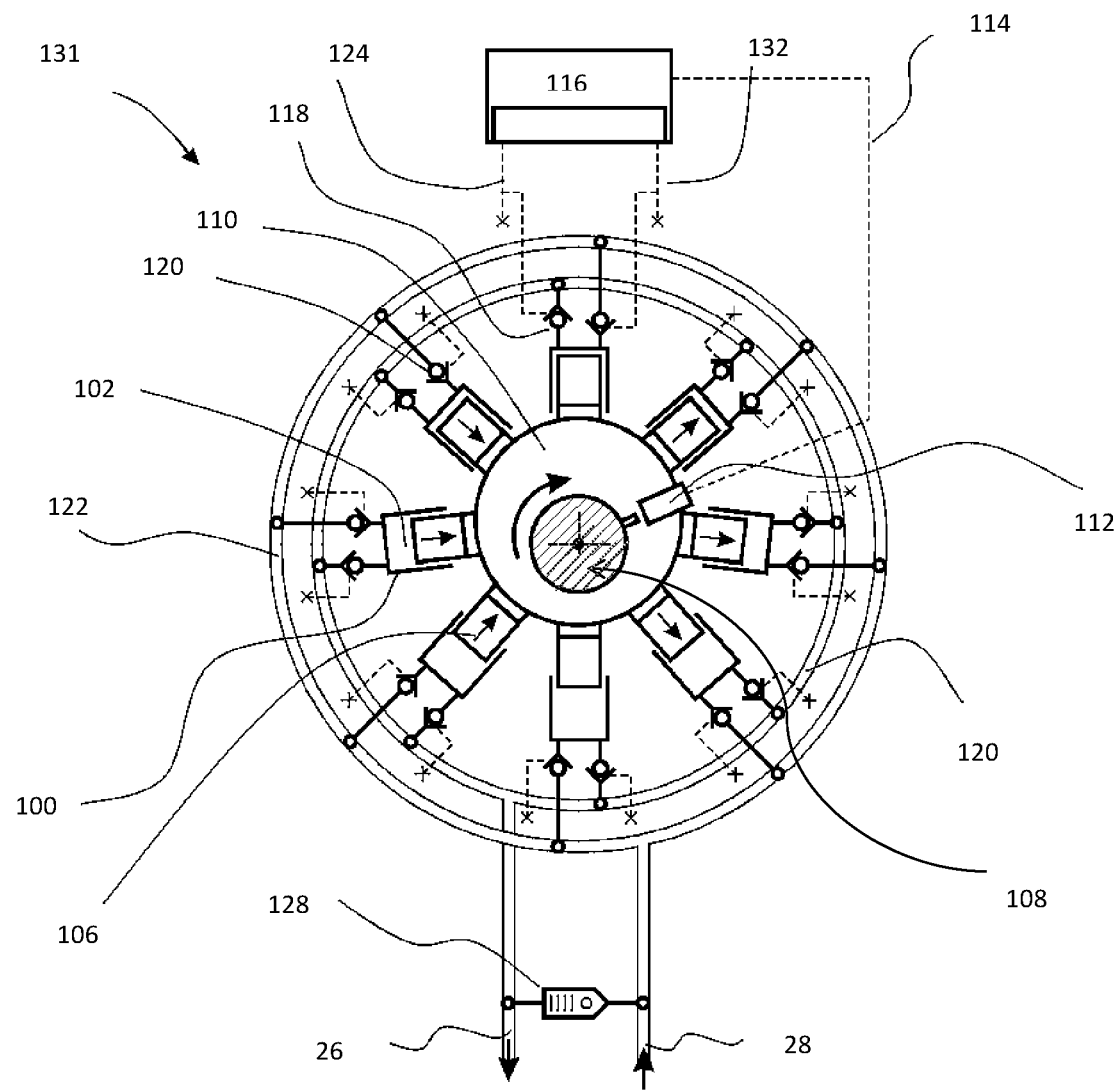
FIG. 2 is a schematic diagram of a hydraulic motor according to the invention.

FIG. 2 illustrates the hydraulic motor 16 in the form of an electronically commutated hydraulic pump/motor comprising a plurality of cylinders 100 which have working volumes 102 defined by the interior surfaces of the cylinders and pistons 106 which are driven from a rotatable shaft 108 by an eccentric cam 110 and which reciprocate within the cylinders to cyclically vary the working volume of the cylinders. The rotatable shaft is firmly connected to and rotates with the generator drive shaft 20. A shaft position and speed sensor 112 determines the instantaneous angular position and speed of rotation of the shaft, and through signal line 114 informs the machine controller 116 of the motor, which enables the machine controller to determine the instantaneous phase of the cycles of each cylinder.

The cylinders are each associated with Low Pressure Valves (LPVs) in the form of electronically actuated face-sealing poppet valves 118, which face inwards toward their associated cylinder and are operable to selectively seal off a channel extending from the cylinder to a low pressure hydraulic fluid line 120, which may connect one or several cylinders, or indeed all as is shown here, to the low pressure hydraulic fluid line 26 of the WTG. The LPVs are normally open solenoid closed valves which open passively when the pressure within the cylinder is less than or equal to the pressure within the low pressure hydraulic fluid line, i.e. during an intake stroke, to bring the cylinder into fluid communication with the low pressure hydraulic fluid line, but are selectively closable under the active control of the controller via LPV control lines 124 to bring the cylinder out of fluid communication with the low pressure hydraulic fluid line. Alternative electronically controllable valves may be employed, such as normally closed solenoid opened valves.

The cylinders are each further associated with High Pressure Valves (HPVs) 126 in the form of pressure actuated delivery valves. The HPVs open outwards from the cylinders and are operable to seal off a channel extending from the cylinder to a high pressure hydraulic fluid line 122, which may connect one or several cylinders, or indeed all as is shown here, to the transmission high pressure hydraulic fluid line 28. The HPVs function as normally-closed pressure-opening check valves which open passively when the pressure within the cylinder exceeds the pressure within the high pressure hydraulic fluid line. The HPVs also function as normally-closed solenoid opened check valves which the controller may selectively hold open via HPV control lines 132 once that HPV is opened by pressure within the associated cylinder. Typically the HPV is not openable by the controller against pressure in the high pressure hydraulic fluid line. The HPV may additionally be openable under the control of the controller when there is pressure in the high pressure hydraulic fluid line but not in the cylinder, or may be partially openable, for example if the valve is of the type and is operated according to the method disclosed in WO 2008/029073 or WO 2010/029358.

In a normal mode of operation described in, for example, EP 0 361 927, EP 0 494 236, and EP 1 537 333, the contents of which are hereby incorporated herein by way of this reference, the motor controller selects the net rate of displacement of fluid from the high pressure hydraulic fluid line by the hydraulic motor by actively closing one or more of the LPVs shortly before the point of minimum volume in the associated cylinder's cycle, closing the path to the low pressure hydraulic fluid line which causes the fluid in the cylinder to be compressed by the remainder of the contraction stroke. The associated HPV opens when the pressure across it equalises and a small amount of fluid is directed out through the associated HPV. The motor controller then actively holds open the associated HPV, typically until near the maximum volume in the associated cylinder's cycle, admitting fluid from the high pressure hydraulic fluid line and applying a torque to the rotatable shaft. In an optional pumping mode the controller selects the net rate of displacement of fluid to the high pressure hydraulic fluid line by the hydraulic motor by actively closing one or more of the LPVs typically near the point of maximum volume in the associated cylinder's cycle, closing the path to the low pressure hydraulic fluid line and thereby directing fluid out through the associated HPV on the subsequent contraction stroke (but does not actively hold open the HPV). The controller selects the number and sequence of LPV closures and HPV openings to produce a flow or create a shaft torque or power to satisfy a selected net rate of displacement. As well as determining whether or not to close or hold open the LPVs on a cycle by cycle basis, the controller is operable to vary the precise phasing of the closure of the HPVs with respect to the varying cylinder volume and thereby to select the net rate of displacement of fluid from the high pressure to the low pressure hydraulic fluid line or vice versa.

Arrows on the ports 122, 28 indicate fluid flow in the motoring mode; in the pumping mode the flow is reversed. A pressure relief valve 128 may protect the hydraulic motor from damage.

Figure 3:
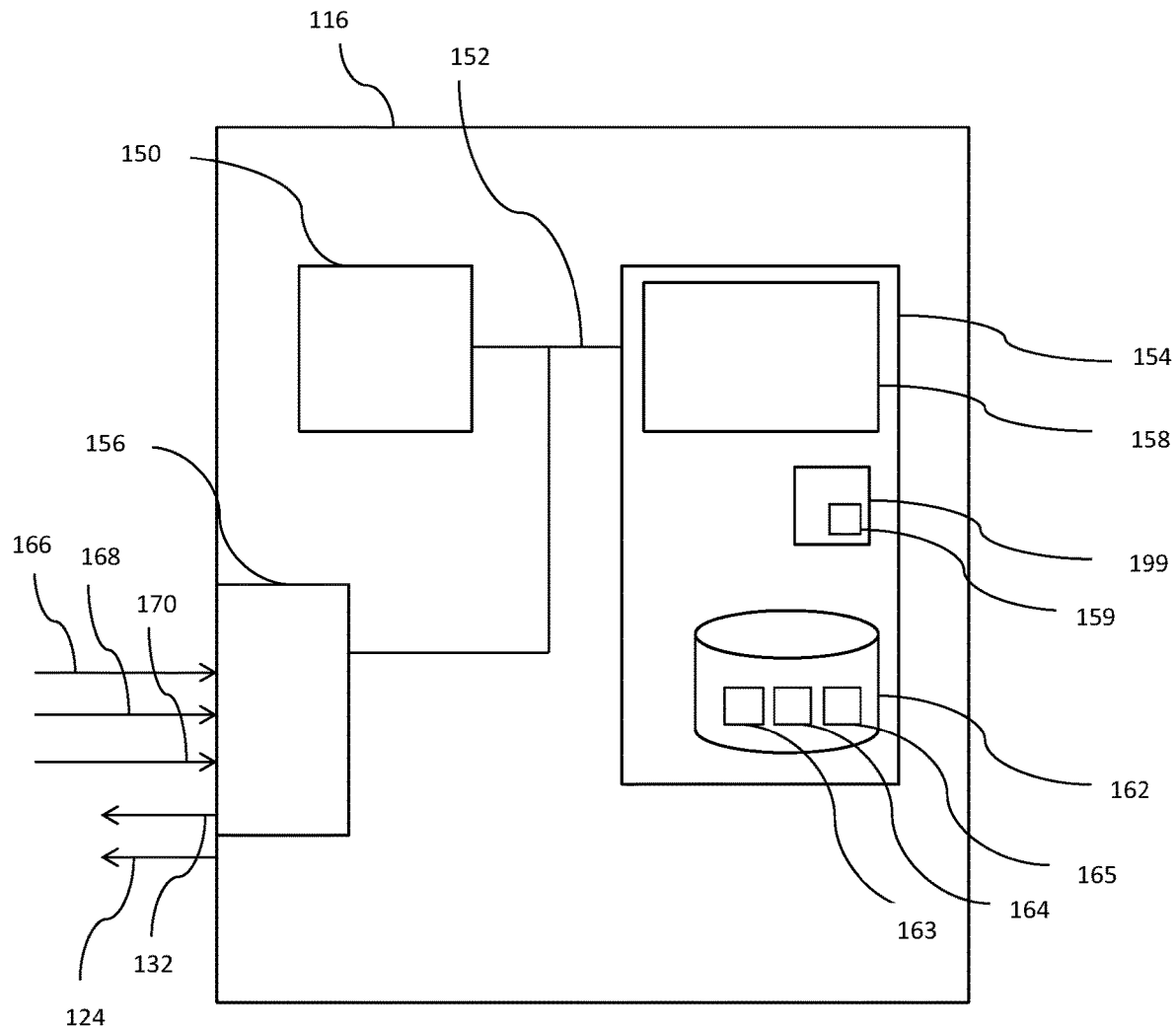
FIG. 3 is a schematic diagram of the valve control module of the hydraulic motor.

FIG. 3 is a schematic diagram of the machine controller 116 of the motor. The structure of the pump controller corresponds. A processor 150, such as a microprocessor or microcontroller, is in electronic communication through a bus 152 with memory 154 and an input-output port 156. The memory stores a program 158 which implements execution of a displacement determination algorithm to determine the net volume of hydraulic fluid to be displaced by each cylinder on each cycle of cylinder working volume, as well as one or more variables 199 which store an accumulated displacement error value and the memory also stores a database 162 which stores data concerning each cylinder, such as the angular position of each cylinder 163 and whether or not it is deactivated 164 (for example, because it is broken). In some embodiments, the database stores the number of times 165 each cylinder has undergone an active cycle. In some embodiments, the program comprises program code 159, functioning as the resonance determining module, which calculates one or more ranges of undesirable frequencies.

The controller receives a displacement demand signal 34, a shaft position (i.e. orientation) signal 166 and typically a measurement of the pressure 168 in the high pressure line, and a further input signal 170. The speed of rotation of the rotatable shaft is determined from the rate of change of shaft position and function as the speed of rotation of the rotatable shaft The outputs from the controller include high pressure valve control signals through high pressure valve control lines 126 and low pressure valve control signals through low pressure valve control lines 118. The controller aims to match the total displacement from the cylinders to the displacement demand, over time. The shaft position is required to enable valve control signals to be generated in phased relationship with cycles of cylinder working volume. The measurement of pressure can be used to determine the exact amount of hydraulic fluid displaced or in other calculations. The controller might also receive signals indicating whether cylinders are broken, and should therefore be disabled, and to enable the database 162 to be updated accordingly.

The hydraulic pump generally corresponds to the hydraulic motor except that it operates in the pumping mode described above and is typically on a larger scale. Instead of a single lobed eccentric there may be more, in the case of a multi-lobe ring cam. The high pressure valves need not be actively controlled by the controller and may comprise check valves.

Figure 4:
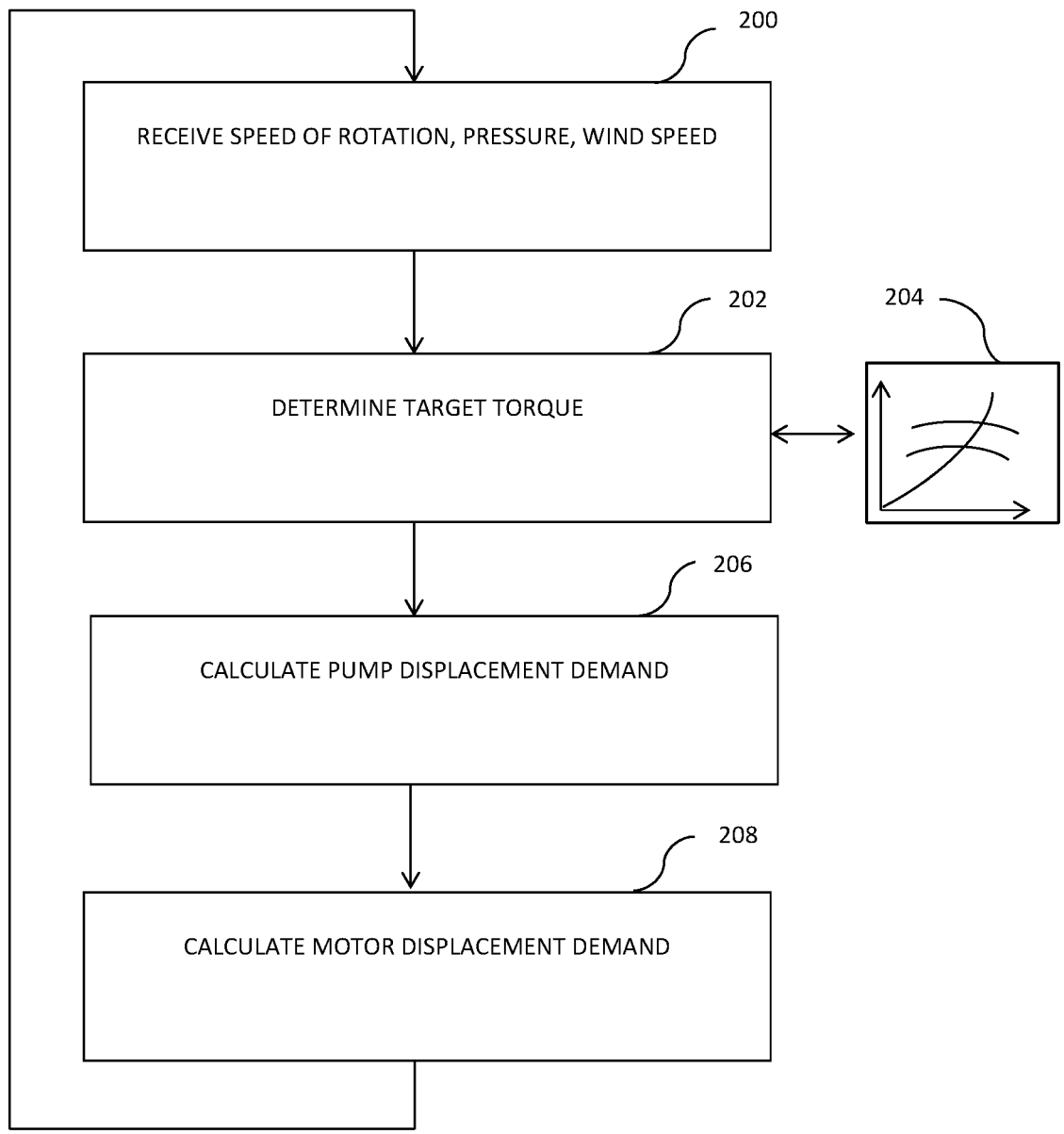
FIG. 4 is a flow diagram of the operation of the transmission valve control module.

During operation of the hydraulic transmission by the process of FIG. 4, the hydraulic transmission controller 156 receives 200 input signals (166, 168, 170) including the speed of rotation of the turbine 6 (which is the same as, or a geared ratio of the speed of rotation of the rotatable shaft of the hydraulic pump, as the two are coupled), and the pressure in the pressurised fluid hydraulic fluid line 12, as well as the wind speed. The transmission controller next determines 202 a target torque to be applied to the turbine by the hydraulic pump, with reference to a look up table 204 which summarises ideal target torque and shaft rotation speed at a plurality of different wind speeds. Once a target torque has been determined the transmission controller then calculates 206 the displacement of the hydraulic pump required to obtain the target torque. This is then transmitted to the hydraulic pump as the displacement demand signal received by the pump. Volumes of hydraulic fluid and rates of displacement may be calculated in any suitable units. This displacement demand can for example be expressed as a fraction of the maximum displacement of which the hydraulic pump is capable per revolution of the rotatable shaft. In this example, the displacement is expressed as an average percentage of the maximum output per revolution of the rotatable shaft. The actual rate of displacement which this represents, expressed as volume of fluid per second, will be the product of both the displacement demand, the maximum volume which can be displaced by a cylinder, the number of cylinders and the speed of rotation of the pump rotatable shaft. The resulting torque will be proportional to this displacement and to the pressure in high pressure hydraulic fluid line.

Once the pump displacement has been calculated, the motor displacement can also be calculated. Typically, the motor displacement is calculated to maintain a desired pressure in the pressurised fluid line. The calculated displacement is transmitted to the motor and received as the demand displacement signal of the motor. However, a number of other factors may be taken into account. For example, the motor displacement demand can be varied in order to vary the pressure in the high pressure hydraulic fluid line, which increases when motor displacement is less than the displacement by the hydraulic pump (in volume per second), and decreases when the displacement of the hydraulic motor is greater than the displacement of the hydraulic pump (in volume per second). There may be other factors. For example, it may be desirable for one or both of the electricity generators to be switched between being driven at a substantially constant torque, and being switched off, to minimise windage losses and maximise the efficiency of electricity generation.

In this example embodiment, the hydraulic motor has the configuration of FIG. 2, in which the cam which drives the pistons has a single lobe, and so there is a single cycle of cylinder working volume per rotation of the rotatable shaft of the hydraulic motor.

Figure 5:
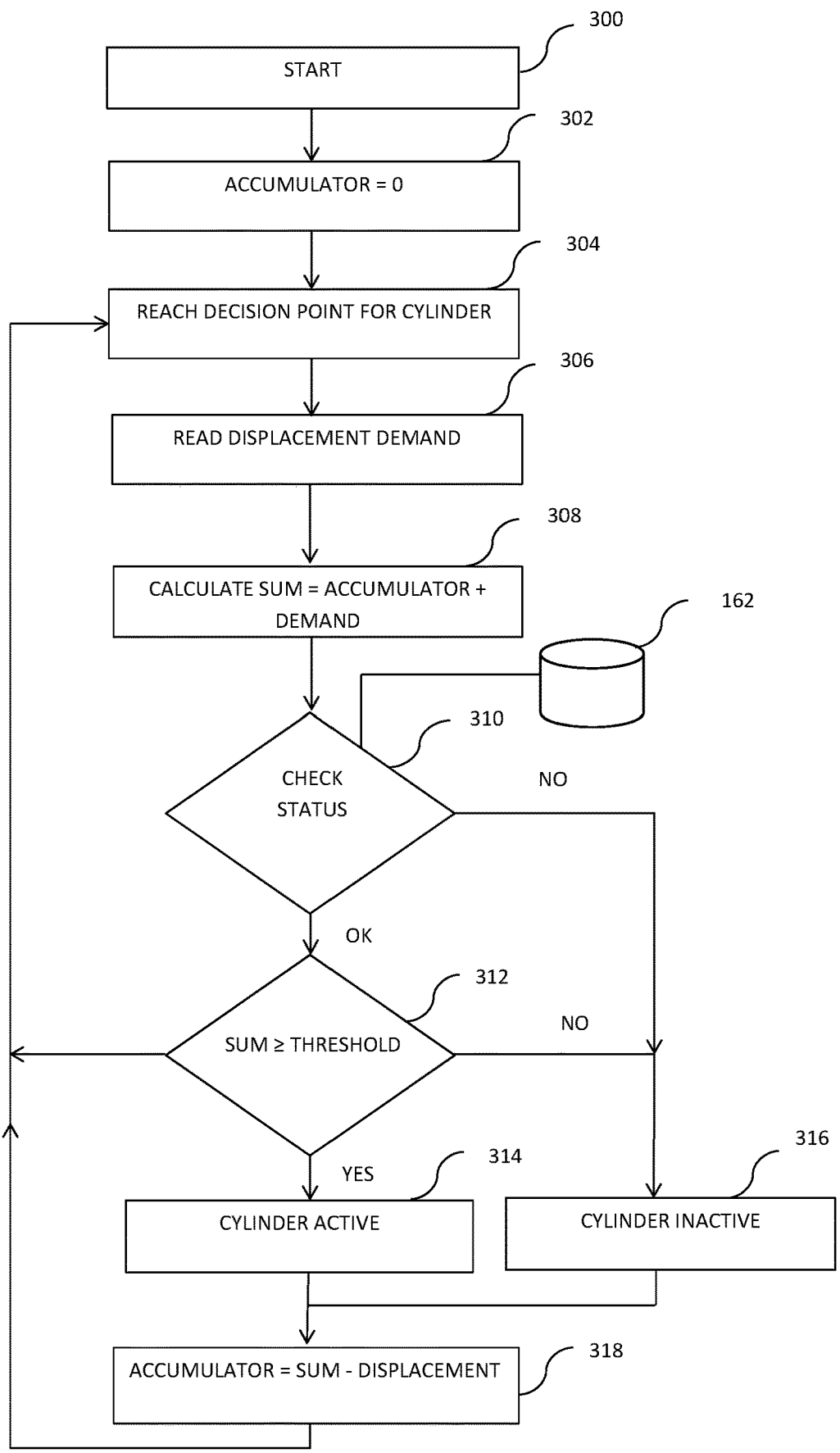
FIG. 5 is a flow diagram of a displacement determination algorithm for determining the displacement by individual cylinders in a normal operating mode, (the first procedure)

FIG. 5 illustrates the procedure carried out by the hydraulic motor to determine the net displacement by each cylinder sequentially, in a default operating procedure (the first procedure), when it is not determined that unwanted frequencies will be generated. The procedure begins 300, whereupon a stored variable algorithmic accumulator is set 302 to zero. The 'algorithmic accumulator', in more commonly known in computer science as an 'accumulator', however a different term is used here to differentiate from the entirely different concept of a hydraulic accumulator. The variable algorithmic accumulator stores the difference between the amount of hydraulic fluid displacement represented by the displacement demand and the amount which is actually displaced.

The rotatable shaft of the hydraulic motor then rotates until it reaches 304 a decision point for an individual cylinder. For the example shown in FIG. 2, there are eight cylinders, and so each decision point will be separated by 45 degrees of rotation of the rotatable shaft. The actual period of time which arises between the decision points will therefore be the period of time required for the rotatable shaft to rotate by 45 degrees, which is inversely proportional to the speed of rotation of the rotatable shaft.

At each decision point, the motor controller reads 306 the motor displacement demand received from the transmission controller. The controller then calculates 308 a variable algorithmic sum which equals algorithmic accumulator plus the demanded displacement. Next, the status of the cylinder which is being considered is checked 310. This is carried out with reference to the database 162, 164 of cylinder data. If it is found that the cylinder is deactivated (for example because it is broken), no further action is taken for that cylinder. The method then repeats from step 304 once the decision point is reached for the next cylinder.

Alternatively, if it is found that the cylinder has not been disabled, then algorithmic sum is compared 312 with a threshold. This value may simply be the maximum volume of hydraulic fluid displaceable by the cylinder, when the only options being considered are an inactive cycle with no net displacement or a full displacement active cycle in which the maximum displacement of hydraulic fluid by the cylinder is selected. However, the threshold may be higher or lower. For example, it may be less than the maximum displacement by an individual cylinder, for example, where it is desired to carry out a partial cycle, in which only part of the maximum displacement of the cylinder is displaced.

If algorithmic sum is greater than or equal to the threshold then it is determined that the cylinder will undergo an active cycle. Alternatively, if algorithmic sum is not greater than or equal to the threshold then it is determined that cylinder will be inactive on its next cycle of cylinder working volume, and will have a net displacement of zero.

Control signals are then sent to the low and high pressure valves for the cylinder under consideration to cause the cylinder to undergo an active or inactive cycle, as determined. (In the case of pumping, it may be that the high pressure valves are not electronically controlled and the control signals only concern the low pressure valves).

This step effectively takes into account the displacement demand represented by the displacement demand signal, and the difference between previous displacements represented by the displacement demand signal previous net displacements determined by the controller (in this case, in the form of the stored error), and then matches the time averaged net displacement of hydraulic fluid by the cylinders to the time averaged displacement represented by the displacement demand signal by causing a cylinder to undergo an active cycle in which it makes a net displacement of hydraulic fluid, if algorithmic sum equals or exceeds a threshold. In that case, the value of the error is set to SUM minus the displacement by the active cylinder. Alternatively, if algorithmic sum does not equal or exceed the threshold, then the cylinder is inactive and algorithmic sum is not modified.

The procedure restarts from step 304 when the decision point is reached for the next cylinder.

It can therefore be seen that algorithmic accumulator maintains a record of the difference between the displacement which has been demanded, and the displacement which has actually occurred. On each cycle, the demanded displacement is added to the displacement error value, and the actual selected displacement is subtracted. Algorithmic accumulator effectively records the difference between demanded and provided displacement and an active cycle takes place whenever this accumulated difference exceeds a threshold.

One skilled in the art will appreciate that the effects of this displacement determination algorithm can be obtained in several ways. For example, rather than subtracting the selected displacement from the algorithmic accumulator variable, it would be possible to sum the displacement which has been demanded, and the displacement which has been delivered, over a period of time, and to select the displacement of individual cylinders to keep the two evenly matched.

In alternative embodiments, there may be sets of cylinders which are operated in phase throughout each cycle of cylinder working volume. For example, this may arise if the cam has multiple lobes or if there are multiple axially spaced banks of cylinders. In this case, at each decision point the selection of an active cycle or inactive cycle may be made for each cylinder in the set at once.

Test Mode

Figure 6:
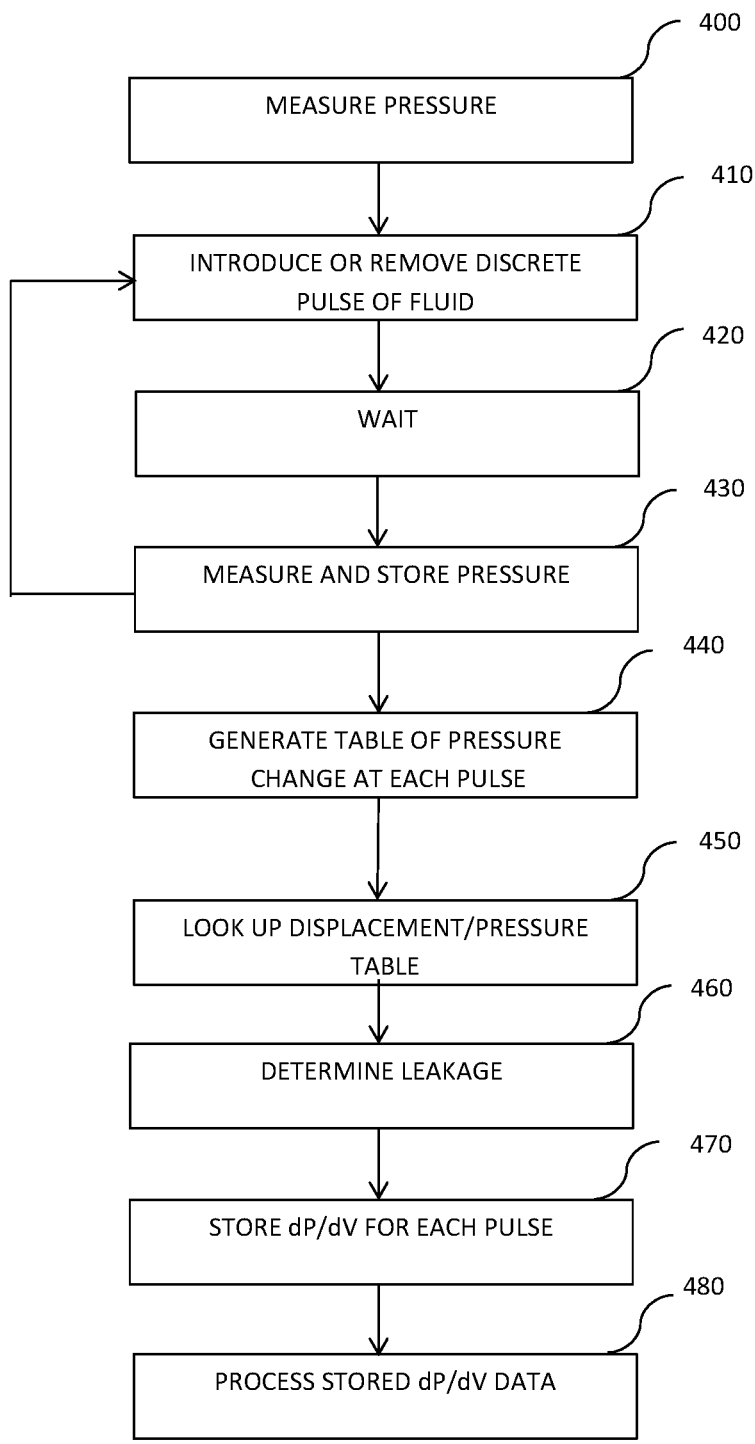
FIG. 6 is a flow diagram of the steps of a first procedure for carrying out the present invention.

FIG. 6 is a flow chart of the steps carried out under the control of the controller of the wind turbine generator in a test mode, carried out before the wind turbine generator enters the operating mode described above. These steps measure the hydraulic stiffness of the hydraulic circuit region which is formed by the high pressure line 28, accumulator 30 and any other pipes, hoses and manifolds which together retain the pressurised fluid on the high pressure side of the transmission. This test is carried out when the hydraulic system is in a quiescent state (at least momentarily), with (in this example) the pressure in the high pressure line 28 initially at a level close to that of the low pressure line. The hydraulic fluid pressure in the high pressure line is measured 400 using a pressure sensor 29. The hydraulic pump 12 is driven by the turbine through the rotating shaft 14.

The pump initially carries out only inactive cycles, with no net displacement of hydraulic fluid into the hydraulic line. The pump then carries out one or more active cycles, to displace a discrete pulse of hydraulic fluid 410 into the high pressure line 28. As a result, the pressure in the high pressure line increases. However, there is an initial pressure overshoot transient followed by some oscillation of pressure which continues for a period of time, due for example to resonances in the flow of hydraulic fluid in the high pressure line. Accordingly, a wait function is executed 420 to provide sufficient time for the pressure resulting from the introduction of hydraulic fluid to settle. After the wait function is completed the pressure is measured, and stored 430. Alternatively, the pressure may be measured repetitively and the value of the pressure on which the pressure measurements are converging may be determined from these measurements. The resulting pressure changes can be seen, for example, in FIG. 7 in which, on the left hand side of the figure, hydraulic fluid is introduced in four discrete pulses, leading to overshoot and then decaying oscillations (ringing) in the measured pressure. For each pulse on the left hand side, the pump carries out pumping strokes, acting as a source of hydraulic fluid and so the pressure increases after each pulse. The pulses are spaced apart in time sufficiently to allow the pressure to settle between each pulse, such that a stable pressure measurement can be taken. The associated fluid pulse size(s) are chosen to be sufficiently large to provide a jump in pressure which may be clearly distinguished from the background leakage pressure losses.

Figures 7, 8:
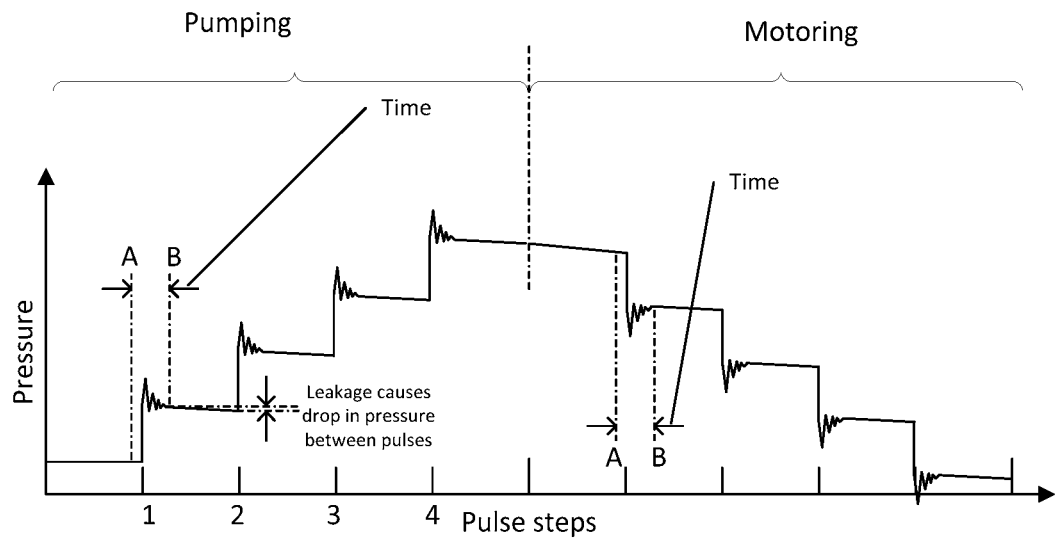
FIG. 7 is a graph of measured pressure within the hydraulic circuit region during an example implementation of the invention. On the left hand side, a hydraulic machine carries out pumping cycles, displacing hydraulic fluid into the hydraulic circuit region, leading to a rise in pressure; on the right hand side, a hydraulic machine carries out motoring cycles, displacing hydraulic fluid out of the hydraulic circuit region, leading to a decrease in pressure.
FIG. 8 is a table showing the measured pressure within the hydraulic circuit region before and after each of a plurality of pulses, along with the change in pressure and the mean of the pressure before and after the respective pulse (Pmid)

The turbine controller generates and stores 440 a table, shown in FIG. 8, of the following data for each pulse: the pressure in the high pressure line before the pulse; the pressure after the pulse, the change in pressure as a result of the pulse and the central pressure (the mean of the pressure before and after the respective pulse).

Figure 9:
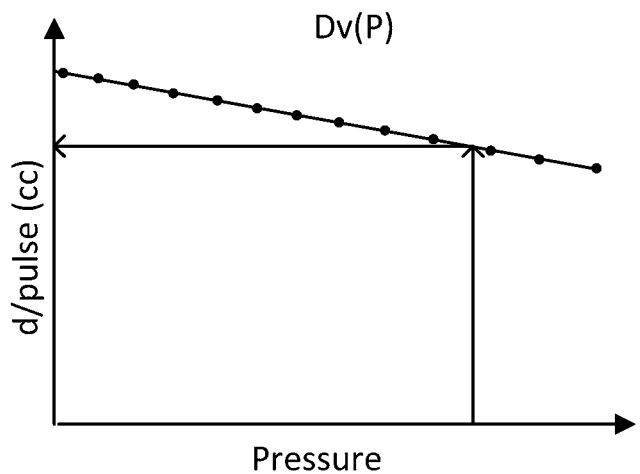
FIG. 9 is an example of a calibration curve relating the displacement in individual pulses of hydraulic fluid to the change in volume within the hydraulic circuit portion at a given pressure.

Next, the controller looks up 450 a precalibrated displacement/pressure calibration table, or function, shown in FIG. 9 which specifies the net volume of hydraulic fluid displaced into or out of the high pressure manifold per active cycle of cylinder volume which makes up the pulse, for a given pressure. This gives a change in volume, dV, for each pulse. This step assists because the volume of hydraulic fluid displaced may vary with pressure for a given volume of a cylinder due, for example, to the compressibility of the hydraulic fluid, the effect of dead volume in the hydraulic machine, which can increase with pressure, or software controlled variations in valve timing reducing maximum displacement at higher pressures to ensure reliable operation.

The phase of the cylinders is closely monitored using a shaft position sensor and the LPV (and if required HPV) valve control signals are accurately timed with reference to this measured phase, and so the precise timing of the start and end of each pulse of hydraulic fluid can be accurately determined.

Figure 10:
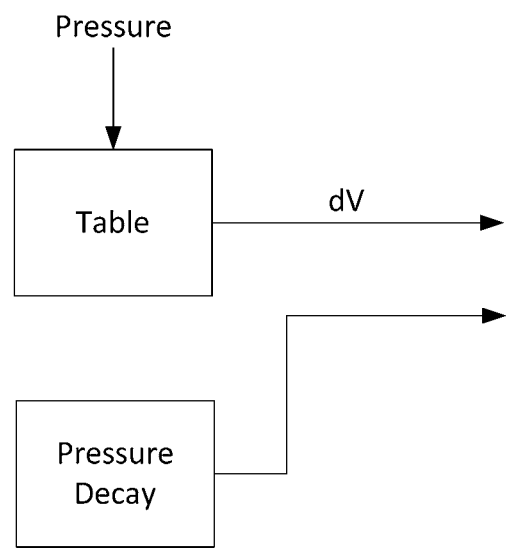
FIG. 10 illustrates the data processed to determine dV and leakage.
Figure 11:
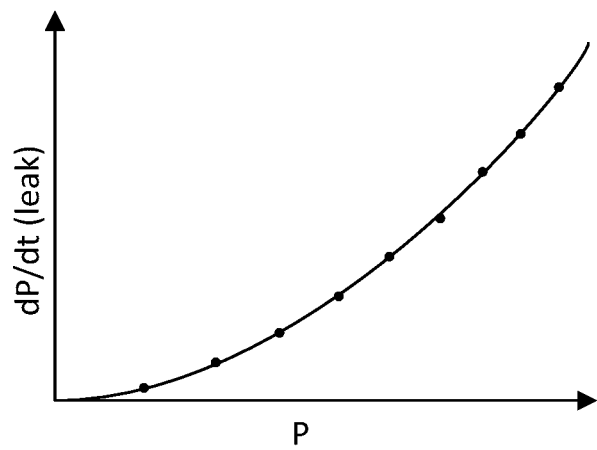
FIG. 11 is an example of the variation in the rate of pressure loss (dP/dt) with pressure (P) due to a level of leakage, obtained from a pressure leakdown test in which hydraulic fluid is allowed to leak from the hydraulic circuit region.
Figure 12:
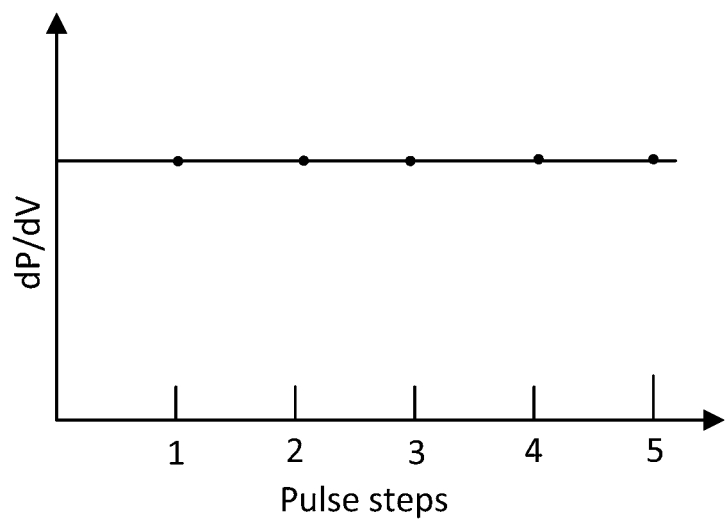
FIG. 12 is a stiffness table in graph form.

Next, the controller estimates leakage 460 from the hydraulic circuit region (e.g. from the hydraulic line, accumulator, connectors etc.). This can, for example, be determined from the decrease in measured pressure between each pulse, or the decrease in measured pressure in pauses where no hydraulic fluid is displaced into or out of the high pressure manifold. This leakage figure is used to correct the measured change in pressure, dP, by subtracting any pressure change due to leakage (FIG. 10). Leakage can be better estimated by measuring the gradient of the measured pressure after each of multiple pulses, or over an extended period of time and taking into account a calibration curve (FIG. 11) which relates the relative rate of pressure loss due to leakage at different pressures. This curve (the relative rate of pressure loss at different pressures) may, for example, have been obtained during an extended pressure leakdown test in which the hydraulic circuit region was pressurised and allowed to leak, e.g. through existing leak paths or a valve or throttle of known cross section.

The resulting leakage-corrected change in pressure, gross dP, is used to calculate the ratio of change in pressure dP to change in volume dV for a given pulse and this ratio (which is a measure of the stiffness of the hydraulic circuit) is stored. The resulting stored stiffness data (dP/dV) values are subsequently processed 480 to obtain measurements of the stiffness of the hydraulic circuit region at different pressures. Example data is shown in FIG. 13 and plotted in FIG. 12.

We have found that, surprisingly, the variation in hydraulic stiffness with pressure can be used to check and measure various different properties of the hydraulic circuit region, and of mechanical parts of the hydraulic region, and of mechanical parts connected to the hydraulic region. This is because the stiffness of different parts predominantly affects the measured hydraulic stiffness (gross dP/dV) at different pressure ranges.

Figure 14:
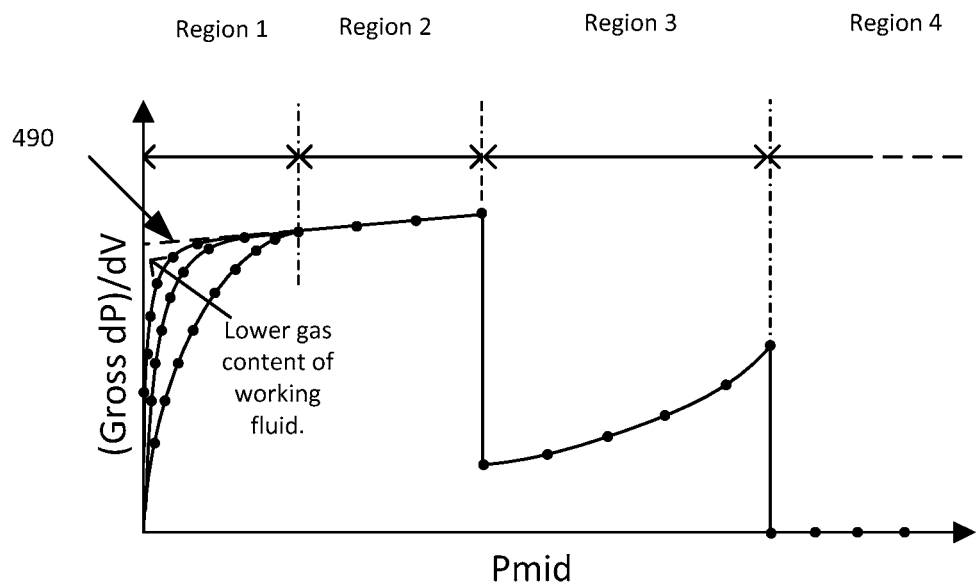
FIG. 14 is a graph of the variation in hydraulic stiffness (gross dP/dV) in the hydraulic circuit region with the pressure in the hydraulic circuit region (dV), showing four different regions; (1) where the presence of gas bubbles/entrained gas has a substantial effect and energy devoted to raising pressure simply acts to compress the gas thus the stiffness is largely determined by the presence of gas; (2) where the hydraulic stiffness is determined predominantly by hoses, pipes, manifolds, and the fluid volume; (3) where the hydraulic stiffness is determined predominantly by the stiffness of the accumulator (unless the accumulator is relatively small); (4) where the hydraulic stiffness is indicate of the characteristics of the pressure relief valve.

FIG. 14 shows the variation in stiffness (gross dP/dV) with pressure in a test in which the pressure is gradually increased from atmospheric pressure 1 bar. Alternatively the pressure may be gradually decreased from a pressure relief valve crack pressure to atmospheric pressure 1 bar, in order to discover the three transition points between the four regions. Alternatively the characterisation of the system may be partial, identifying and characterising 1 or more transition points, requiring a pressure drop or pressure increase between 2 or more regions. As the hydraulic circuit region is initially pressurised by introduced hydraulic fluid (hereafter the first region of the graph), the curve of stiffness with pressure gives a measure of the effect of dissolved gas and gas bubbles/entrained gas on the apparent compressibility of the hydraulic fluid. An arrow on FIG. 14 shows how the effect on stiffness of gas concentration decreases with gas concentration. For zero gas content, stiffness is generally linear with pressure (line 490). Air is found in many hydraulic apparatuses and the effects of air predominantly determine the response of pressure in the high pressure line to the fluid pulses at low pressure (for example, between 1 bar and 20 bar). Indeed, pulses at low pressures may least to relatively little bulk flow of hydraulic fluid through the high pressure line and predominantly lead to compression of the hydraulic fluid As the pressure increases, the amount of gas no longer has an effect (as any gas will have been compressed to a fraction of its original volume, further decreases in volume requiring a far greater increase in pressure, and some will, in time, have dissolved due to the high pressure) and in a second region, the measured stiffness reflects the stiffness of the containers (hoses, pipes and manifolds) which define the walls that retain the hydraulic fluid in the hydraulic circuit region. In this second region, the respective accumulator is below its precharge pressure (above which the gas containing bladder deforms). As the pressure further increases, the gas bladder in the accumulator starts to compress (the third region) and the stiffness drops and then gradually increases again as the accumulator becomes more highly pressurised. The pressure at which stiffness drops, defining the boundary between the second and third regions is the precharge pressure of the accumulator. Finally, in a fourth region, the pressure is sufficiently high that a pressure relief valve opens and the stiffness drops to a low level indicative simply of the characteristics of the pressure release valve. The pressure at which this drop in stiffness occurs is the pressure release valve actuation pressure.

In this first region, there is typically a non-linear relationship between hydraulic stiffness and pressure. The pressure at which the relationship between hydraulic stiffness and pressure makes a transition from non-linear (curved) to generally linear is significant as well as rate of change of stiffness against pressure, above and below this point. Both may be used to indicate gas content (gas bubbles/entrained gas, or dissolved). These characteristics may additionally be used to determine a fault. The size of the fluid pulses in this region is generally small, for example less than the stroke volume of a single cylinder. The smaller the pulses, the more pulses will be performed in region 1, and thus the more pressure measurements will be taken in order to characterise the region. With a highly detailed analysis of hydraulic stiffness with pressure in region 1, conclusions drawn concerning the nature of the aeration of the oil, or otherwise are likely to be more reliable. At the lowest end of the pressure range which makes up region 1, doubling of pressure would generally lead to a halving of the volume of gas bubbles/entrained gas, which accelerates the transition from non-linear gas compression dominating region 1, through to region 2. The displacement required to lead to this doubling gives a good indicator of the volume of gas bubbles/entrained gas present. Whilst the pressure range 1-20 bar might typically define the whole of region 1, a particularly important sub-region might fall between 1 and 2 bar. Pressurisation from atmospheric to the upper level of region 1 may be referred to as initial pressurisation.

In region 2, the compliance of the hoses, manifolds, and hydraulic liquid containing volumes predominately affect hydraulic stiffness. The bulk modulus of the hydraulic liquid can be determined from the hydraulic stiffness. Typically, this region is characterised by linearity (straight line relationship), the lower end being the transition to non-linearity of region 1. The upper end is marked by the sudden drop in stiffness, as the accumulator 'becomes active'. As per below, other systems with less dominant accumulator may demonstrate a much smaller drop in stiffness, and may show no drop in stiffness to mark the upper end. In this case, region 2 curve blends into region 3, in which case there may be no significant point to mark the transition from region 2 to region 3, and in effect the regions may be considered a single region, which predominantly demonstrates the characteristics of region 3 (described below). It may be considered that region 2 disappears, and 2+3 becomes effectively region 3.

In the third region, the hydraulic stiffness of the accumulator has a predominant effect on hydraulic stiffness. The accumulator is present as an energy store and can also be useful to allow smoothing of energy flow. In some embodiments the accumulator volume is however small, with its function relating predominantly to absorbing pulsation (with only modest energy storage capability) and in this case this region may be less clearly dominated by the accumulator, and line characteristics may be indicative of the condition or presence or absence of faults of other parts of the hydraulic machine other than the accumulator (e.g. pipes/hoses, etc).

The lower end of this region is marked by the equating of the accumulator pre-charge, where below this point the accumulator bladder is at its fullest volume, once the system pressure matches the accumulator bladder volume, so the bladder volume will start to decrease as pressure increases. In effect, below the accumulator pre-charge pressure, the accumulator is inactive. Once the system pressure matches the pre-charge pressure, so the accumulator becomes active and the large volume of the bladder contributes to the hydraulic stiffness. Hence, at this transition point, the graph shows a large drop in stiffness as the accumulator becomes 'active'.

In region 4, the hydraulic stiffness is indicative of the pressure relief valve characteristics. In some embodiments, the pressure relief valve opens to return the pressure in the hydraulic line to below a threshold each time the pressure rises. In alternative pressure relief valve designs, the pressure is set to a new higher level above the original threshold, in which case the pressure steps up each time it goes above the primary pressure relief valve setting.

Each of these regions may be characterised, and a deviation from the characterisation indicative of a particular hydraulic stiffness, and may be used to determine the state of individual parts (e.g. condition, wear, fault, etc). The characteristics of interest includes but are not limited to the pressure associated with the lower end and the upper end, the gradient of the line, the linearity or non-linearity of the relationship, the continuous or discontinuous nature of the line, or of any other characteristic, characterising the relation between stiffness and pressure. The trace/data is compared with expected trace/data, i.e. the points at which step should occur, the gradient between these step points, and any other characteristics.

Figure 16:
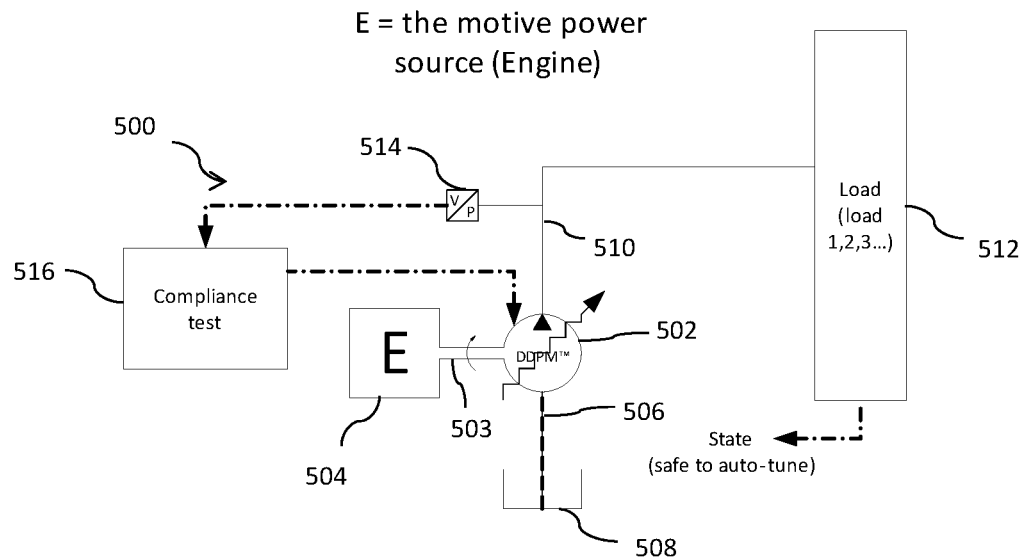
FIG. 16 is an example of a hydraulic apparatus in the form of an injection moulding machine.

Although simplified as four distinct regions, it will be recognised by one skilled in the art that the relationships described are not perfect, and multiple factors will cause deviation from the graphed 'ideal/expected' curves. For example, which the hydraulic stiffness versus pressure graph of FIG. 16 shows all lines of various air content unifying for region 2, it will be understood by one skilled in the art that the lines are simply closely coincident in this region, and are not actually equal.

Figure 15:
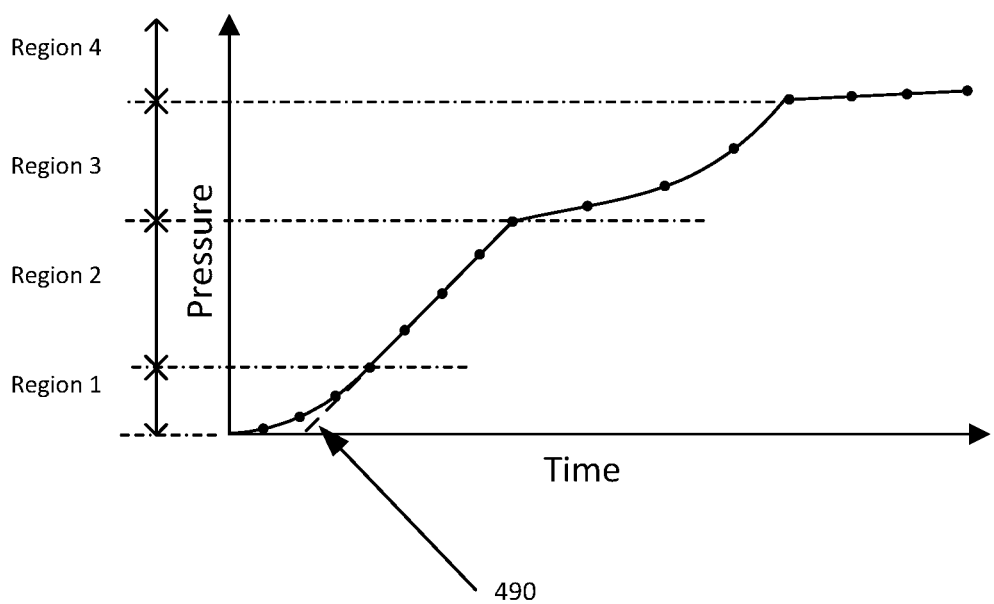
FIG. 15 is a graph of the variation in pressure with the total volume of hydraulic fluid displaced into the hydraulic circuit region during a test.

Generally, the pressure is either increased through this stiffness measurement protocol by repetitively introducing pulses of hydraulic fluid although it is also possible to decrease the pressure through a stiffness measurement protocol by repetitively removing pulses of hydraulic fluid, for example as per the right hand side of FIG. 7 which the hydraulic machine executes motoring cycles, and so acts as a sink for hydraulic fluid and each pulse reduces the pressure in the hydraulic circuit region. With reference to FIG. 15, as the total volume displaced into or out of the hydraulic circuit region increases, the measured pressure varies with a variable gradient showing the four regions described above. As with FIG. 14, the hydraulic stiffness if no gas bubbles/ entrained gas was present 490 would be generally linear with pressure at low pressures.

Accordingly, this embodiment of the invention can be used to determine various system and component properties, with the ability to distinguish between.

1. The effect of and level of dissolved gas/gas bubbles/ entrained gas/aeration in the hydraulic fluid on the compressibility of the hydraulic fluid can be identified and level determined from the hydraulic stiffness at the lowest pressure levels (within the first region).

2. The compressibility of the hydraulic fluid itself can be measured from the variation in gross dP/dV within the second region in which region the gas bubbles/entrained gas is predominantly dissolved.

3. The stiffness of the walls which retain the hydraulic fluid in the hydraulic circuit region can be determined from the shape of the gross dP/dV curve in the second region.

4. The precharge pressure in the accumulator can be measured from the pressure at which the stiffness of the system drops as pressure increases (or from the pressure at which the stiffness of the system rises as pressure decreases) (i.e. the pressure at which there is a transition from region 2 to region 3). If the precharge pressure is significantly higher or lower than expected, this could indicate a fault. For example, if the accumulator comprises a gas filled resilient compartment and the gas has partially leaked out the pressure at which this rapid change in pressure occurs will decrease.

5. The health of the accumulator can be determined from the curve of gross dP/dV with pressure (for example, in region 3). For example, if there is a defect in a resilient compartment within the accumulator, this will typically lead to an increase in the gradient of (gross dP/dV) with pressure. If the accumulator comprises a foam filled compartment which has suffered from mechanical or thermal failure, for example, there will be a change in stiffness. If hydraulic fluid leaks into the resilient compartment or an accumulator having a resilient compartment, or into the air side of a piston accumulator, the hydraulic stiffness will increase. In the case of a piston accumulator, if there has been wear or other damage to the walls past which the piston slides, the piston may move discontinuously, leading to pressure waves which can be detected or may stick in position, leading to an increase in hydraulic stiffness, for example.

6. The pressure at which the pressure relief valve operates can be determined from the pressure at which gross dP/dV drops to a low value as the pressure reaches the fourth region.

7. Leakage can be identified and quantified from the difference between the measured rate of pressure change (at a given pressure) and that which would occur due only to the inflow or outflow of pulses of hydraulic fluid.

Accordingly, these stiffness measurements can be used to monitor the status of, and check for faults in, various mechanical components of the hydraulic circuit region. The relatively short duration of the pulses of hydraulic fluid enable the change in pressure due to the controlled displacement of hydraulic fluid to be readily distinguished from leakage.

Although in this example, the variation in gross dP/dV with pressure is measured and used to determine properties of different components, the same regions will be apparent when analysing the variation with pressure in other parameters related to the change in pressure in the hydraulic circuit region due to the said displacement of one or more said pulses of hydraulic fluid of known volume into or out of the hydraulic circuit region.

In this example, the change in pressure was measured arising from pulses in which hydraulic fluid was introduced into the hydraulic circuit region. However, the invention may alternatively (or additionally, for example alternately) use the change in pressure arising from pulses in which hydraulic fluid is displaced out of the hydraulic circuit region, for example as shown in the right hand side of FIG. 7.

In this example, leakage has been determined by monitoring the pressure loss between pulses. However, if leakage was expected to be limited (e.g. leakage from the high pressure line to the low pressure line in a vehicle transmission) it may be sufficient for the pulses to be carried out in sufficiently quick succession that leakage should be minimal, provided that they are spaced apart sufficiently for the equilibrium pressure after overshoot and oscillation to be determined.

Advantageously, for a hydraulic system which already includes a synthetically commutated hydraulic pump or motor of the type described above and a suitably located pressure sensor, the ability to measure stiffness parameters of multiple parts can be obtained through programming a controller without a requirement to add further physical parts, thereby providing cost advantages.

Use of Measured Properties During Operation

Although the measurements of stiffness properties of parts of the hydraulic circuit region are in themselves useful to monitor and diagnose the correct function of the parts, these measurements can be used in subsequent control of the wind turbine generator. Accordingly, after the test mode described, the resulting measurements used during operation to control the selection of active or inactive cycles of cylinder volume or the precise opening or closing time of the low pressure and/or high pressure valve during active cycles.

Automatic Tuning

The stiffness of the hydraulic circuit region is used to tune the volumes of hydraulic fluid which are displaced by the hydraulic pump and/or the hydraulic motor (which is controllable to displace pulses of working fluid out of the hydraulic circuit region) during operation. Although the measurements may be carried out by the hydraulic pump which is coupled to the hydraulic circuit region, the resulting hydraulic stiffness information is equally useful to control the operation of the hydraulic motor which is also coupled to the same hydraulic circuit region. (Correspondingly, the test mode might be carried out by the hydraulic motor and the resulting stiffness data used to control either or both the hydraulic pump or the hydraulic motor).

For example, reference to the algorithm described above and illustrated with reference to FIG. 5, the threshold 312 with which algorithmic sum is compared may vary with pressure in dependence on the measured variation in hydraulic stiffness (gross dP/dV) with pressure. If the stiffness is relatively higher, the threshold might be relatively lower.

The amount of hydraulic fluid that is displaced during individual cycles of cylinder volume by the hydraulic pump or motor can be selected taking into account the current pressure in the hydraulic circuit portion and the measured values of gross dP/dV. This is relevant when, for at least some active cycles, the hydraulic pump or motor is carrying out part mode cycles in which it makes neither zero net displacement of hydraulic fluid nor the maximum displacement which it can make but a fraction of the maximum displacement, with the fraction being selected by the active control of at least the low pressure valve, and in some cases also the high pressure valve, of the respective cylinder. Part mode cycles are taught in EP 1537333, the contents of which are incorporated herein by virtue of this reference. For example, when carrying out part mode cycles while pumping, the amount of hydraulic fluid that is displaced can be increased by closing the low pressure valve earlier in the contraction stroke, or decreased by closing it later in the contraction stroke. Part mode cycles are typically interspersed with inactive cycle or full mode cycles (in which the maximum displacement of hydraulic fluid is made), to improve efficiency.

The amount of hydraulic fluid displaced into or out of the hydraulic circuit region to control the hydraulic transmission can be determined by the wind turbine controller in dependence on the measured leakage of hydraulic fluid and the variation in the rate of leakage with pressure (as per FIG. 13), to ensure that a target pressure in achieved in the hydraulic line. Accordingly, the net displacement of hydraulic fluid into or out of the hydraulic circuit region is compensated for leakage.

The amount of hydraulic fluid displaced into or out of the hydraulic circuit region may be determined by the wind turbine controller in dependence on the measured variation in hydraulic stiffness with pressure. Accordingly, if measured gross dP/dV is higher at a first pressure than at a second pressure, a lower volume of hydraulic fluid will be displaced to achieve a given desired change in target pressure at the first pressure than at the second pressure. Again, this can help to ensure that the target pressure is matched as closely as possible by the pressure in the hydraulic circuit region.

Still further, the timing of the opening and/or closing of the low or high pressure valves of a synthetically commutated hydraulic machine may be tuned in dependence on the measurements made in the test mode. For example, properties of gas bubbles/entrained gas can be determined from the measurements of gross dP/dV in the first pressure region. One effect of gas bubbles/entrained gas is to slow the depressurisation of a cylinder during the expansion stroke of a motoring cycle, after the high pressure valve has closed. This is because gas which is dissolved in the hydraulic fluid at this time will come out of solution, leading to a higher pressure than would be the case if pure hydraulic fluid was expanded. It is important that after the high pressure valve has closed, the pressure in the cylinder drops sufficiently low that the low pressure valve can open. Hence if the measurements made in the test mode indicate that there is a relatively high amount of gas bubbles/entrained gas, the timing of the closure of the high pressure valve can be adjusted to be relatively early, to give sufficient time for the pressure in the cylinder to reduce to the point that the low pressure valve can open.

Detecting Movement of Coupled Parts

In the wind turbine generator illustrated in FIG. 1, whenever the hydraulic pump displaces a pulse of hydraulic fluid from the low pressure manifold into the high pressure manifold, there is an impulse delivered to the rotatable shaft of the pump and thereby to the turbine rotor and blades through the drive shaft 14.

The response of the movement of these parts (drive shaft, turbine, blades) to the displacement of the pulses of hydraulic fluid can therefore also be measured. Accordingly, the wind turbine controller monitors the speed of rotation of the drive shaft (which is the same as the speed of rotation of the turbine unless there is gearing present in which case the speed of rotation are linked by the applicable gearing ratio), and accelerometers and strain gauges 38 in the blades.

Similarly, whenever the hydraulic motor displaces a pulse of hydraulic fluid from the high pressure manifold into the low pressure manifold, there is an impulse delivered to the rotatable shaft of the motor, and therefore the electrical generator 18. The response of the movement of the rotatable shaft of the motor and the electrical properties of the electricity output by the electrical generator (e.g. current, voltage, power output, phase) or of the electricity in the field coils (for example) can also be measured.

These measurements enable faults to be detected. For example, damage to the wind turbine blades, the build-up of ice on the turbine blades, damage to the electricity generator, excessive friction resisting rotation of parts which rotate with the drive shaft and so forth. Fault can be determined by comparing the expected response of parts with the measured response.

These measurements can again be employed to control the wind turbine generator during subsequent operation. For example, the displacement of the hydraulic pump might be increased if the turbine has higher inertia to give a higher torque. The pressure in the high pressure line or the displacement of the hydraulic motor (each of which affects the torque of the hydraulic motor) might be adapted in dependence on the measured properties of the electricity generated by the hydraulic motor to generate electricity more efficiently or to avoid damage to the electrical generator.

Example 2—Industrial Hydraulic Machine

A second example, illustrated with reference to FIG. 16, concerns a general industrial machine, for example an injection moulding machine 500, having a high pressure line 510, functioning as the hydraulic circuit region. The high pressure line is in electronic communication with a hydraulic pump-motor 502 of the type illustrated in FIG. 2 operable to displace hydraulic fluid from a low pressure line 506 which extends to a tank 508 into the high pressure line (in a pumping mode of operation) or to displace hydraulic fluid from the high pressure line to the low pressure line (in a motoring mode of operation). The fluid working machine 502 is driven by (and in some embodiments drives) an engine 504, such as an electric engine which may be powered by (and in some embodiments capable of recharging) a battery.

The high pressure line 510 drives a load 512, for example a hydraulically operated press (in the case of an injection moulding machine). The load may be another type of hydraulically operated actuator, such as a hydraulic ram or hydraulically powered electrical generator. There may be a plurality of loads and valves to selectively connect different loads or different parts of loads (e.g. opposite ends of the cylinders of double acting rams) to the high pressure line. The high pressure line has a pressure sensor 514. A controller 516 comprises at least one processor in electronic communication with computer readable memory (not shown) storing a computer program which processes the pressure measured by the pressure sensor while controlling the hydraulic pump-motor 502 in order to carry out the invention.

Again, the test procedure described above with reference to FIGS. 6 to 15 is carried out to measure the hydraulic stiffness properties of the hydraulic circuit region formed by the high pressure line 510 and connected fluid containing chambers of the loads, for example the interior of cylinders having pistons mounted therein to form a ram.

In this example, no fluid accumulator is provided and so region 3 of FIGS. 14 and 15 is not present. However, it is possible to determine stiffness properties of the loads, for example, the resistance to movement of a ram, the inertia of a load etc. Worn seals on a ram may for example cause friction, thus increasing the required level of pressure to move the ram and the stiffness, thus the measurement of the stiffness may indicate work seals. One skilled in the art will be able to anticipate various other load properties which may be integrally linked with stiffness.

Industrial hydraulic systems with a structure generally as shown in FIG. 6 include manufacturing machines and robots, for example, and may experience a significant amount of leakage (from the high pressure side, e.g. high pressure line 510 to the low pressure side, e.g. a tank 508 or a low pressure line). For example, the machine of the present invention might be used within a hydraulic power pack connected to an industrial system, comprising a series of gear motors which suffer relatively high leakage. Accordingly, it is especially useful to obtain a measurement of fluid leakage in such a system, which can be used to control the displacement of hydraulic fluid by the hydraulic pump-motor during subsequent operation to accurately regulate the volume and/or pressure of hydraulic liquid supplied to actuators.

The method of the present invention can therefore be used before operating to check for excessive leakage, or damage to an accumulator, or potentially an unexpected stiffness of one or more loads. If the measured stiffness parameters are outside of predetermined ranges, an alarm may be raised or the system may be disabled. For example if excessive leakage is determined, if the accumulator pre-charge pressure is deemed too low for normal operation and possibly unsafe (e.g. below 20 bar 'safe minimum level'), the system will prevent operation, to protect the machine and/or user.

If leakage is however found to be within normal operating bounds, the machine will operate. The measured leakage may be used during subsequent operation, for example, to determine the amount of hydraulic fluid displaced into or out of high pressure line 510 to obtain a given movement of an actuator which functions as the load (e.g. a press of an industrial moulding machine, an arm of an excavator or robot).

Especially in an industrial system, there may be a load or loads 512 which themselves offer a different stiffness to the hydraulic system at different pressures. A parameter, dPload, is calculated, which is an estimate of the change in pressure arising from the loads considered as a whole as a result of a given volume of displaced hydraulic fluid. Considering primarily the machine associated with fluid sink/source, it involves an estimate of some other volume that has left the system (e.g. a ram that extends, and increases the volume of the hydraulic circuit). This estimation will take into account the total switching out of certain loads (which are totally isolated in certain states). Thus, properties of the loads (e.g. stiffness of actuators) can be determined from the measured stiffness properties of the hydraulic circuit region.

Example 3—Vehicle Transmission

Figure 17:
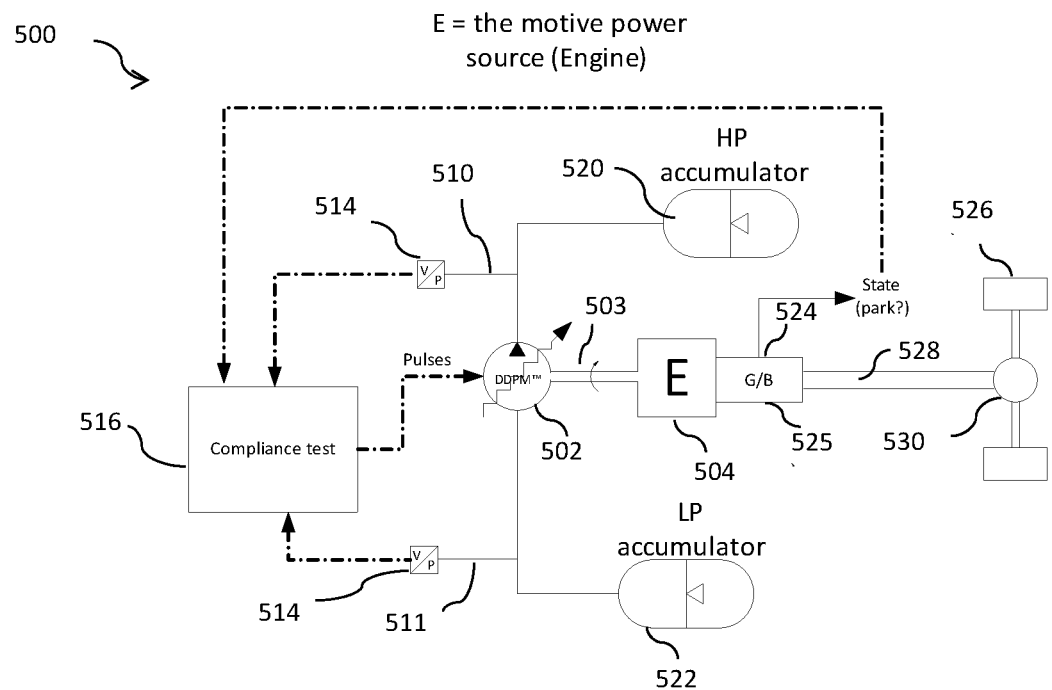
FIG. 17 is an example of a hydraulic apparatus in the form of a vehicle transmission.

In another example, shown in FIG. 17, a further hydraulic apparatus, in the form of a vehicle transmission, has two hydraulic circuit regions on each of which the method of invention is carried out. The first hydraulic circuit region is the high pressure side of this vehicle transmission comprising a high pressure line 510 which is in fluid communication with an accumulator 520. Again, the high pressure line 510 has a pressure sensor 514 which sends signals to a controller 516. The second hydraulic circuit region is the low pressure side comprising low pressure line 511 which has a further pressure sensor 514, in electronic communication with the same controller, and is also in communication with an accumulator 522 intended for low pressure use. The high pressure and low pressure side accumulators 520 and 522 each contain pressurised gas sacks with a precharge pressure. The precharge pressure for the high pressure side accumulator is greater than for the low pressure side accumulator. Hydraulic machine 502 drives or is driven by a motive power source (e.g. an engine) 504 through a drive shaft 503. Motive power source 504 is coupled to a drive shaft 528 which drives wheels 526 through differential 530.

A position sensor 524 associated with gearbox 525 determines if the drive shaft 503 is stationary and if the vehicle is in parking mode and feeds this signal back to the controller 516. Note that as well as driving the wheels, the hydraulic machine 502 can be driven by the wheels, in a regenerative braking mode.

A hydraulic hybrid system using a hydraulic pump-motor of the type described above with reference to FIG. 2, within a vehicle, is likely to suffer only light leakage of hydraulic fluid from the high pressure side 510 to the low pressure side 511. Failure of hydraulic accumulators may impact the safety, drivability etc of hydraulic hybrid vehicles during a typical operating cycle and in an example the control system of such a vehicle is set to carry out a self-check on a periodic basis.

The component stiffness check (a 'self test') will only be initiated in the context of a vehicle meeting the following requirements:

Gearbox signals 'park' state, AND
Prime mover speed is in 'idle' state, AND
System controller indicates 'safe' state, AND
Sensor check indicates 'okay' (i.e. The readings from sensors meet normal function criteria, e.g. a range check)
One or more of the above requirements could be omitted.
In addition to the above requirements, execution of a component stiffness check could depend on one or more of the following:

If the vehicle is undergoing a 'cold start' and/or 'normal start' and/or 'any start'.
If requested by the user (a manual request/override).
If the elapsed time since the last component stiffness check exceeds a threshold (e.g. >1 week).
If a new fault is detected in the hydraulic system (e.g. by another sensing or monitoring system).
If a maintenance mode is entered.

For a vehicle, key aims of the stiffness check are to determine the accumulator pre-charge on the low pressure and/or high pressure side and also to detect leakage of hydraulic fluid (again from either the low pressure and/or high pressure side).

Depressurisation Step

In some embodiments of the invention, the pressure within the hydraulic circuit region is deliberately reduced prior to carrying out a hydraulic stiffness check. This enables the pressure to be increased through the pressure regions in which the properties of different parts predominantly determine hydraulic stiffness. The pressure is only increased by the pulses—working fluid is only displaced into the hydraulic circuit region by the pulses and so the pressure will rise due to each pulse, although there is typically some hydraulic leakage and consequent (usually minor) pressure loss between pulses.

To enable this, the pressure might be reduced by driving a motor (which may be the said hydraulic machine) using the hydraulic fluid in the hydraulic circuit region. For example, in a vehicle having a wheel motor driven by the hydraulic fluid, the wheel motor may be driven to reduce pressure. Alternatively, a pressure reduction means might be provided, for example, an electronically actuatable valve (pressure dump valve) might be provided which is actuatable to allow pressurised fluid to flow out of the high pressure line (to the low pressure line or tank). Depressurisation might also be achieved by controlling the valves of a synthetically commutated hydraulic machine to displace hydraulic fluid from the high pressure side to the low pressure side. A similar depressurisation procedure might also be carried out after a stiffness check has been completed, so that the hydraulic system is in a suitable state ("ready state") for subsequent operation.

The hydraulic system could instead be pressurised before operation (for example by operating a synthetically commutated hydraulic pump to displace hydraulic fluid into the hydraulic circuit region) and then the stiffness test might be involve displacing known volumes of hydraulic fluid out of the hydraulic circuit region.

Varying the Pressure in the Hydraulic Circuit Portion

The rate at which hydraulic fluid is displaced into (or out of) the hydraulic circuit region may be varied with pressure. Once sufficient data points (measurements of gross dP/dV) have been obtained to measure a particular physical property which affects hydraulic stiffness (e.g. dissolved gas, the stiffness of hoses and pipes, or the precharge pressure of an accumulator), the pressure may then be increased (or decreased) more rapidly until it reaches a range in which a different physical property (e.g. the stiffness of hoses and pipes, or the precharge pressure of an accumulator or the pressure which a pressure relief valve opens) is to be measured, and then the rate of change may be decreased again. The rate at which hydraulic fluid is displaced into (or out of) the hydraulic circuit can be varied by changing the proportion of cycles of working chambers which carry out active cycles, or otherwise changing the frequency of displacement of, or volume of, pulses of hydraulic fluid.

In some embodiments, the stiffness properties of the hydraulic circuit region may be partly or entirely unknown. If too large a volume of hydraulic fluid is displaced initially, the pressure in the hydraulic circuit region may pass quickly through or even bypass some of the pressure ranges in which useful measurements of stiffness may be made, for example regions 1 and/or 2. In such cases, the discrete volumes introduced as part of the invention to pressurise the system begin pressurising in a conservative manner. Performing a full pumping stroke, in a system with small volume, may result in system pressure transitioning directly from low atmospheric pressure to perhaps somewhere in region 3 (above an accumulator pre-charge level). Accordingly, the first pulse size could be set very small, for example by using a 'part stroke' mode of operation, whereby only a fraction (which may be a small fraction, e.g. less than 20% or less than 10%) of the maximum displacement by a working chamber during a single cycle of working chamber volume are provided. This would avoid the possibility of providing large volume flow to a stiff system with small volume, thus bypassing regions 1 and 2.

In an example, in order to make useful measurements while the pressure passes through regions 1 and 2, the fluid pulse size is set to 15% of the maximum stroke volume of an individual working chamber. If it is determined that more than 200 of such pulses are required to raise pressure to the level required to measure a physical property of a different part, then for subsequent pulses (within the same test, or subsequent test), the test procedure could instead use full (maximum) stroke cycles of working chamber volume. One skilled in the art can see that the timing of potential transition between part strokes, and larger volume part strokes or full strokes, could be determined in countless ways. A very stiff system requires little pumped volume before pressure is raised, and the invention could perhaps avoid the need to wait for a hydraulically soft system to be provided with a great many small part pumps, over an excessively long period of time. If too many pulses are needed to raise pressure even to a modest level, then the system could abort the current strategy, and instead select longer part or even full fluid pulses. Furthermore, the pulse size, or size of displacement associated with that pulse, could be chosen based on an observed stiffness.

Such embodiments of the invention are particularly applicable in an industrial environment where a pump (or motor) is taken 'off the shelf' by an applications engineer, and is fitted to a new, possibly previously unused and, in particular, not previously characterised hydraulic system.

Characterisation of Frequency Response

The invention can also be employed to determine the frequency domain response of the pressure in the hydraulic circuit portion, as measured by a pressure sensor, to the displacement of pulses of hydraulic fluid into or out of the hydraulic circuit portion. In a hydraulic system, each line has its own length and stiffness. Accordingly, the response of the measured pressure to displacement of a fluid portion is more complex than a simple change in pressure after a specific time. Typically, response of the pressure to introduction of a pulse of hydraulic fluid consists of an initial pulse followed by ringing, which is caused by reflections. Long hoses and pressure lines are example sources of such reflections.

The present invention involves the conversion of the impulse response to the transfer function which specifies the relationship between the input (displacement of discrete pulses of hydraulic fluid) and output (measured pressure). This process of conversion involves determining both natural resonant frequencies, and characteristic echo times.

The steps required are:
- A plurality of individual pulses of hydraulic fluid are displaced into the hydraulic circuit region. This leads to a step change in the volume of hydraulic fluid in the hydraulic circuit region.
- The pressure in the hydraulic circuit region is sampled frequently and stored, to thereby store the response of the pressure to this step change in the volume of hydraulic fluid.
- The time series of pressure measurements are aligned using the known time as which fluid pulses were delivered and deconvoluted to give the impulse response of the pressure in the hydraulic circuit region to individual displacements of a pulse of hydraulic fluid. In order to facilitate deconvolution, the precise timing of the start and end of pulses is measured accurately. This can be determined from the phase of working chamber cycles e.g. measured using a sensor of the position of the rotatable shaft of the hydraulic machine, and analysis of the decisions as to whether to undergo active or inactive cycles on individual cycles of working chamber volume, and measurement (or logging) of the precise timing of valve opening and closing signals. This step may comprise allowing for the time difference between a valve opening or closing signal being generated and the actual opening or closing of the valve as a result.
- A transfer function (system signature response) is then derived from the impulse response, for example using a Laplace transform.
- The transfer function can then be used to determine the resonant frequency of the system and therefore characteristic reflection times etc. Reflections may arise from changes in impedance, e.g. changes in hose diameter etc.
- The resulting frequency analysis may be stored in the form of a data structure setting out the relative intensity of different frequency components and the relative phase of different frequency components.

This enables the response of the pressure in the hydraulic circuit region to be characterised in the time domain. This time domain analysis is useful to identify damage to the hydraulic circuit region. For example, to identify unexpected resonances (or the lack of expected resonances). The time domain analysis is also useful to regulate subsequent operation of the hydraulic apparatus.

The pattern of active and inactive cycles of working chamber volume generated by the hydraulic pump or motor will generate characteristic frequencies, which will change as the shaft speed of the hydraulic pump or motor, or the fraction of cycles of working chamber volume which are active cycles changes. The pattern of active and inactive cycles can therefore be varied to avoid the characteristic frequency of the pattern of active and inactive cycles remaining at the resonant frequency or other relatively intense components of the frequency response of the hydraulic circuit region.

The pulses of hydraulic fluid may have different durations. For example, part mode strokes (in which a non-zero, non-unity fraction of the maximum displacement of hydraulic fluid by a working chamber in a volume cycle) have shorter durations than full mode strokes (in which the maximum displacement of hydraulic fluid is selected). They provide sharper fluid pulses with a higher proportion of higher frequency components. This enables more detailed characterisation of the time response of the hydraulic circuit region.

Time Domain Analysis of Coupled Parts

The time domain analysis can also provide information about the response of parts of the hydraulic system other than the hydraulic circuit region. The time domain response of some parts outside of the hydraulic circuit region can be measured from the time response of the pressure in the hydraulic circuit region but the time domain response of some parts outside of the hydraulic circuit region can be measured using other sensors, e.g. acceleration sensors, position sensors, strain gauges or shaft speed sensors.

For example, in an embodiment where the hydraulic machine is coupled to an engine by a belt, the belt will have a natural frequency which can be determined from the impulse response of the speed of rotation of the hydraulic machine rotatable shaft to fluid pulses generated by the hydraulic machine.

Further Uses of Measured Data

The data measured during the test mode can be used in numerous ways.

Another example embodiment uses a variation of the pressure control algorithm disclosed in EP 0361927 and EP 0494236 (the contents of each of which are incorporated herein by virtue of this reference). These publications teach making a decision as to whether to undergo an active or inactive cycle on each cycle of working chamber volume by comparing a measured pressure in the high pressure line (i.e. at the output of a pump or input of a motor) with a target pressure and selecting whichever or an active or inactive cycle would cause the measured pressure to best match the target pressure. Thus the pressure of hydraulic fluid in the high pressure side is regulated to match the target. The difference between measured pressure and target pressure required to cause an active cycle to be selected instead of an inactive cycle may vary with pressure depending on the measured hydraulic stiffness (gross dP/dV) for that pressure. Typically, the pressure control algorithm will be implemented using feedback control (e.g. negative feedback) and the parameters of the feedback control (e.g. gain) can be varied with pressure depending on the variation in measured hydraulic stiffness (gross dP/dV) with pressure to thereby smooth the regulated pressure or to minimise overshoot or oscillation. Thus, the algorithm which selects active or inactive cycles on each cycle of working chamber volume may take into account the measured hydraulic stiffness.

In another embodiment, a first algorithm is used to select active or inactive cycles on each cycle of working chamber volume when the pressure is below a threshold pressure and a second algorithm is used for the same purpose above a threshold pressure, and the threshold pressure depends on the measured stiffness properties, for example the threshold pressure may be the measured precharge pressure of the accumulator. Similarly, the threshold might be adapted to take into account the effects of present gas (dissolved gas or gas bubbles). A greater amount of present gas will reduce the actual volume of hydraulic fluid which is displaced during each active cycle, for given valve opening and closing timings. The effect of present gas can be determined from the shape of the gross dP/dV curve at low pressures and used to modify the threshold, or otherwise adapt the algorithm which selects the net displacement of hydraulic fluid by each cylinder on each cycle. Again, the fraction of maximum displacement made by a cylinder during a part mode cycle can be selected taking into account the determined effect of present gas.

Analysis of Unknown System

The test method described above with reference to FIGS. 6 through 15 is also useful to enable the setting of operating parameters for a hydraulic pump or motor which is attached to a hydraulic circuit region of unknown properties, for example, of unknown volume, of unknown stiffness (e.g. of hoses, pipes etc), which may or may not have an accumulator, which if present may have unknown properties (stiffness, precharge pressure), or in the presence of an unknown hydraulic fluid. By carrying out the test method, these properties of the hydraulic circuit region to which the hydraulic pump or motor is attached can be determined, facilitating subsequent operation of the hydraulic system comprising the hydraulic pump or motor and hydraulic circuit region. The test may therefore be carried out in an initial operating mode, when the hydraulic pump or motor is first operated.

Slip Analysis

One application of the invention is to measuring circumstances in which slip can occur, for example, in a clutch in a drivetrain (524, 525, 528, 530, 526) coupled to the hydraulic machine 504 of a vehicle transmission according to FIG. 17 or the blade side drivetrain (6, 8, 14) coupled to the hydraulic pump 12 or the generator-side drivetrain (18, 20, 22) coupled to the hydraulic motor, both of the wind turbine generator of FIG. 1. To detect slip, the hydraulic machine makes displacements of discrete pulses of hydraulic fluid (from the high pressure line to the low pressure line in the example of the vehicle transmission and from the low pressure line to the high pressure line in the example of the blade-side drivetrain of the wind turbine generator, or in a second wind turbine generator example; from the high pressure line to the low pressure line in the example of the generator-side drivetrain), each of which has generally the same magnitude of discrete pulses and displacement. However the pressure in the high pressure line is gradually increased and so the torque generated by each pulse increases. The measured speed of the rotating shaft of the hydraulic machine (14) or other drivetrain parts coupled to the rotating shaft of the hydraulic machine (e.g. drive shaft 528) therefore becomes larger with each pulse. In normal operation, without slip, there is a slight drop in speed associated with each such pulse, however when the torque generated is sufficiently high as to cause slip in couplings (e.g. in a clutch), the drop in speed is greater than would be expected. A synthetically commutated hydraulic machine will typically have a relatively low inertia relative to the drivetrain to which it is attached and so its speed will drop significantly when slip occurs. This increased reduction in shaft speed is detected and used to determine at what torque slip begins to occur.

This can be used to calculate transient limits of torque which should be generated by the hydraulic apparatus in use and during subsequent operation of the hydraulic apparatus, the displacement of the hydraulic machine can be controlled to avoid the torque which is generated by the hydraulic machine exceeding these transient limits. Similarly, the speed at which the prime mover attached to a hydraulic machine responds to changes in the torque generated by the hydraulic machine (particularly embodied as the pump entrained with the prime mover in a vehicle transmission) can be measured and used in subsequent control. Similarly, in a vehicle transmission, the speed at which the wheels respond to changes in the torque generated by the hydraulic machine (either during acceleration when the machine is a motor, or during braking when the machine is a pump) can be measured and used in subsequent control (perhaps as part of a regenerative braking, antilock braking, hydro-motoring or traction control strategy).

The invention claimed is:

1. A method of determining one or more properties of a hydraulic apparatus, the apparatus comprising:
   a hydraulic machine and a hydraulic circuit region in hydraulic communication with the hydraulic machine, the hydraulic machine being controllable to displace pulses of hydraulic fluid of one of a plurality of different volumes into or out of the hydraulic circuit region, the method comprising:
   determining a pulse parameter corresponding to a required volume of hydraulic fluid to displace in one or more pulses;
   controlling the hydraulic machine to displace one or more pulses of hydraulic fluid of the required volume into or out of the hydraulic circuit region in dependence on the pulse parameter;
   making at least one measurement of the response of part of the hydraulic apparatus to the said one or more pulses; and
   determining the one or more properties of the hydraulic apparatus in dependence on the measured response and the pulse parameter.

2. The method according to claim 1, wherein the part of the hydraulic apparatus, the response of which is measured, is the hydraulic circuit region and at least one said measurement is a measurement of the pressure in the hydraulic circuit region.

3. The method according to claim 1, wherein the part of the hydraulic apparatus, the response of which is measured, is the hydraulic machine, or a part which is coupled to the hydraulic machine, or a part which is coupled to the hydraulic circuit region other than through the hydraulic machine.

4. The method according to claim 1, wherein the one or more properties are properties of the hydraulic circuit region or properties of a part which is coupled to the hydraulic machine.

5. The method according to claim 1, wherein the at least one measurement is of a parameter related to the change in the pressure in the hydraulic circuit region due to the displacement of one or more said pulses of hydraulic fluid of known volume into or out of the hydraulic circuit region.

6. The method according to claim 5, wherein the parameter related to the change in the pressure in the hydraulic circuit region is the change in the pressure in the hydraulic circuit region measured by a pressure sensor or is the change in the speed of rotation of or torque acting on the rotating shaft of the hydraulic machine measured by sensing the speed of rotation of or torque acting on a rotating shaft of the hydraulic machine.

7. The method according to claim 5, comprising, at each of a plurality of different pressures in the hydraulic circuit region, controlling the hydraulic machine to displace one or more pulses of hydraulic fluid of known volume into or out of the hydraulic circuit region and determining a parameter related to the change in the pressure in the hydraulic circuit region due to the displacement of one or more said pulses of hydraulic fluid of known volume into or out of the hydraulic circuit region and storing the resulting parameter or data derived therefrom with reference to the pressure in the hydraulic circuit region or a parameter related to said pressure when the measurements were taken.

8. The method according to claim 5, wherein the one or more properties of the hydraulic apparatus comprise hydraulic stiffness properties of the hydraulic circuit region.

9. The method according to claim 5, wherein the one or more said properties of the hydraulic apparatus comprise physical properties of different mechanical parts of the hydraulic circuit region, individually determined from measurements at different pressures of hydraulic fluid in the hydraulic circuit region.

10. The method according to claim 5, comprising processing the determined pressure changes and measurements of the pressure in the hydraulic circuit region at different times to calculate a parameter relating to the rate of leakage of hydraulic fluid from the hydraulic circuit region.

11. The method according to claim 1, wherein the at least one measurement is of a parameter related to the change in the speed or torque acting on a rotating shaft of the hydraulic machine due to the displacement of one or more said pulses of hydraulic fluid of known volume into or out of the hydraulic circuit region hydraulically connected to the hydraulic machine.

12. The method according to claim 1, wherein the hydraulic circuit region is in hydraulic communication with one or more further said hydraulic machines which are controllable to displace pulses of hydraulic fluid into or out of the hydraulic circuit region and the method comprises, at each of a plurality of different pressures in the hydraulic circuit region, controlling one or both of the hydraulic machines to displace one or more pulses of hydraulic fluid of known volume into or out of the hydraulic circuit region, the method also comprising determining a parameter related to the change in the pressure in the hydraulic circuit region due to the displacement of one or more said pulses of hydraulic fluid of known volume into or out of the hydraulic circuit region.

13. The method according to claim 1, wherein the response of the pressure in the hydraulic circuit region to the one or more pulses is used to determine one or more properties of a part of the hydraulic apparatus which is not part of the hydraulic circuit region.

14. The method according to claim 1, wherein the response which is measured is the response of something other than the pressure in the hydraulic circuit region, the response including a mechanical response that includes movement of a part, a change in the speed of rotation of a part, a change in torque acting on a part, a change in the vibration of a part, or an electrical response.

15. The method according to claim 1, wherein one or more of the properties of the hydraulic apparatus are properties of the response, in the time domain, of the hydraulic circuit region, or of another part of the apparatus to the one or more pulses of hydraulic fluid.

16. The method according to claim 1, further comprising controlling the hydraulic apparatus taking into account the stored one or more properties.

17. The method according to claim 1, wherein the displacement of pulses provides step changes in the pressure of the hydraulic circuit region.

18. The method according to claim 1, wherein the pulses of hydraulic fluid are discrete.

* * * * *